(12) United States Patent
Matsuda

(10) Patent No.: US 8,164,407 B2
(45) Date of Patent: Apr. 24, 2012

(54) POWER SUPPLY CIRCUIT AND ILLUMINATION SYSTEM

(75) Inventor: Junichi Matsuda, Tokyo (JP)

(73) Assignee: NEC Corporation, Tokyo (JP)

( * ) Notice: Subject to any disclaimer, the term of this patent is extended or adjusted under 35 U.S.C. 154(b) by 858 days.

(21) Appl. No.: 12/159,296

(22) PCT Filed: Dec. 27, 2006

(86) PCT No.: PCT/JP2006/326003
§ 371 (c)(1),
(2), (4) Date: Jun. 26, 2008

(87) PCT Pub. No.: WO2007/074849
PCT Pub. Date: Jul. 5, 2007

(65) Prior Publication Data
US 2010/0231784 A1    Sep. 16, 2010

(30) Foreign Application Priority Data

Dec. 28, 2005   (JP) .................................. 2005-377865
Dec. 26, 2006   (JP) .................................. 2006-349351

(51) Int. Cl.
*H01F 17/06*     (2006.01)
*H05B 37/02*     (2006.01)
*H05B 39/04*     (2006.01)
*H05B 41/36*     (2006.01)
*F21V 23/02*     (2006.01)

(52) U.S. Cl. ......................... 336/175; 315/218; 362/260

(58) Field of Classification Search .......... 323/247–248, 323/355; 315/246, 326, 200 R, 218
See application file for complete search history.

(56) References Cited

U.S. PATENT DOCUMENTS 5,030,889 A  *  7/1991  El-Hamamsy et al.  ... 315/200 R
(Continued)

FOREIGN PATENT DOCUMENTS

| JP | 3022483 U    | 12/1995 |
|----|--------------|---------|
| JP | 8-23335 A    | 1/1996  |
| JP | 8-203324 A   | 8/1996  |
| JP | 2001-251238 A| 9/2001  |
| JP | 2002-245571 A| 8/2002  |
| JP | 2004-166449 A| 6/2004  |
| JP | 2005-354888 A| 12/2005 |

OTHER PUBLICATIONS

Japanese Office Action issued on Aug. 17, 2011 in the corresponding Japanese Patent Application No. 2007-551997.

*Primary Examiner* — Jacob Y Choi
*Assistant Examiner* — Henry Luong
(74) *Attorney, Agent, or Firm* — Sughrue Mion, PLLC

(57) ABSTRACT

[Problems to be Solved] To solve a problem that introducing electric appliances such as a transmitter for transmitting micro radio waves such as Bluetooth and RFID, a transmitter for transmitting infrared rays, and a camera for capturing an image into an in-house requires a high cost.

[Means to Solve the Problems] Energy is acquired from a magnetic field that is generated by a current for turning on a fluorescent lamp of a lighting equipment so as to drive the electric appliances such as a transmitter for transmitting micro radio waves such as Bluetooth and RFID, a transmitter for transmitting infrared rays, and a camera for capturing an image.

45 Claims, 17 Drawing Sheets

U.S. PATENT DOCUMENTS

| | | | |
|---|---|---|---|
| 5,859,489 A * | 1/1999 | Shimada | 310/318 |
| 6,246,183 B1 * | 6/2001 | Buonavita | 315/248 |
| 6,414,447 B1 * | 7/2002 | Kitamura et al. | 315/272 |
| 7,397,194 B2 * | 7/2008 | Garbowicz et al. | 315/86 |
| 2001/0021639 A1 * | 9/2001 | Kaku | 455/41 |
| 2002/0057062 A1 * | 5/2002 | Kisaichi et al. | 315/291 |
| 2005/0237010 A1 * | 10/2005 | Ying et al. | 315/312 |
| 2006/0017028 A1 * | 1/2006 | Ohara et al. | 250/580 |
| 2006/0186833 A1 * | 8/2006 | Yu et al. | 315/307 |
| 2007/0177161 A1 * | 8/2007 | Ishii et al. | 356/614 |

\* cited by examiner

B2 COIL
B3 FLUORESCENT TUBE
TO POWER SUPPLY CIRCUIT A2
B1 MAGNETIC MATERIAL

A6 ENERGY ACQUISITION UNIT CONNECTION INTERFACE
A8 INTERNAL CIRCUIT
POWER ACCUMULATION UNIT — E1
VOLTAGE CONVERSION UNIT — D2
RECTIFICATION UNIT — D1
A7 EXTERNAL APPLIANCE CONNECTION INTERFACE

POWER SUPPLY CIRCUIT AND ILLUMINATION SYSTEM

APPLICABLE FIELD IN THE INDUSTRY

The present invention relates to a power supply circuit, and more particularly to a technology of a power supply circuit for acquiring a power from a lighting equipment.

BACKGROUND ART

An attention has been paid to a technology of specifying a position of a terminal at a high precision in an in-house. Specifically, the technology of employing a signal of a wireless LAN (Local Area Network) that is set by an enterprise, a shop, or the like, or the technology of specifying a position employing Bluetooth, RFID (Radio Frequency Identification) etc. is known.

However, specifying a position of the terminal at a high precision by employing a wireless LAN necessitates a capability of receiving a signal being sent from three wireless LAN base stations or more, and as is often the case with the wireless LAN, no design countermeasure is taken and the base stations are installed at a random position, so there is no guarantee that signals being sent from three wireless LAN base stations or more can be received.

In the system of specifying a position of the terminal by employing a transmitter for transmitting micro radio waves such as Bluetooth and RFID, or a transmitter for transmitting infrared rays, the terminal side has a function of receiving the micro radio wave and the infrared-rays. In the case that the terminal has received the micro radio wave or the infrared-rays, the position of the transmitter, which are transmitting its micro radio wave or its infrared-rays, is assumed to be a position of the terminal. Thus, the arrival distance of the micro radio wave or the infrared rays becomes a degree of a positioning precision, and the positioning at a pinpoint becomes possible; however an arrangement of a large number of the transmitters in a wall and a ceiling is necessitated.

The power has to be supplied to the transmitter being arranged in a wall and a ceiling. So as to enable the power to be supplied, as one method, it is thinkable to do a wiring work for the power supply, which aims at supplying a direct-current power for driving the transmitter.

Further, as another method, the method is thinkable of installing an AC-DC converter for each transmitter being installed in a ceiling and a wall, and causing an AC power supply wire already arranged in an installation location of the transmitter to branch, thereby to input the power into the AC-DC converter.

DISCLOSURE OF THE INVENTION

Problems to be Solved by the Invention

Each of the above-mentioned two methods is a method of directly supplying the power to the transmitter by employing the power supply wiring, and it is also possible to supply the power in a no-contact manner by utilizing a coil and supplying the power via a magnetic field.

In this case, the AC power supply wire is drawn out from the already wired AC power supply line, and a magnetic field generator having a primary coil integrated for generating a magnetic field that changes periodically is installed for each installation location of the transmitter. A secondary coil has been provided inside the transmitter, whereby the method is thinkable of employing an induced electromotive force generated in the secondary coil to drive the transmitter by installing the transmitter in the magnetic field that the primary coil generates.

The problem to be solved by the present invention is that the cost that is necessary for installing the transmitter for transmitting the micro radio waves such as Bluetooth and RFID, or the transmitter for transmitting the infrared rays is high.

The reason is that installing the transmitter for transmitting the micro radio waves such as Bluetooth and RFID, or the transmitter for transmitting the infrared rays necessitates making a wiring for the DC power supply wire in some cases, and installing the AC-DC converter and the magnetic field generator by drawing out the AC power supply wire in some cases for a purpose of securing the power supply.

Thereupon, the problem to be solved by the present invention is to provide a power supply device that can be utilized at a low cost in an in-house.

Means for Solve the Problem

The first invention for solve the above-mentioned problems, which is a power supply circuit for acquiring a power from a lighting equipment, is characterized in including a power acquisition unit for acquiring the power by utilizing a magnetic field that is generated by a current for turning on a fluorescent lamp of the lighting equipment.

The second invention for solve the above-mentioned problems is characterized in that, in the above-mentioned first invention, when the fluorescent lamp is a fluorescent lamp that is turned on by an alternating current of which a frequency is higher than that of a commercial power supply, the power acquisition unit acquires the power with an electromagnetic induction from the magnetic field that is generated by the alternating current.

The third invention for solve the above-mentioned problems is characterized in that, in one of the above-mentioned first and second inventions, the power acquisition unit is a coil.

The fourth invention for solve the above-mentioned problems is characterized in that, in one of the above-mentioned first to third inventions, the power acquisition unit includes a magnetic material and a coil wound onto this magnetic material.

The fifth invention for solve the above-mentioned problems is characterized in that, in the above-mentioned fourth invention, the magnetic material is ring-shaped.

The six invention for solve the above-mentioned problems is characterized in that, in one of the above-mentioned fourth and fifth inventions, the magnetic material is mounted so as to encircle a fluorescent tube of the fluorescent lamp.

The seventh invention for solve the above-mentioned problems is characterized in that, in one of the above-mentioned fourth and fifth inventions, the magnetic material is mounted so as to encircle an electric wire for supplying a current for turning on the fluorescent lamp.

The eighth invention for solve the above-mentioned problems is characterized in that, in one of the above-mentioned fourth to seventh inventions, the magnetic material is configured of a plurality of magnetic materials.

The ninth invention for solve the above-mentioned problems is characterized in, in one of the above-mentioned first to eighth inventions, including a rectification unit for rectifying an AC voltage supplied from the power acquisition unit into a DC voltage.

The tenth invention for solve the above-mentioned problems is characterized in, in the above-mentioned ninth invention, including a power conversion unit for converting the DC voltage supplied from the rectification unit into a predetermined voltage.

The eleventh invention for solve the above-mentioned problems is characterized in that, in one of the above-mentioned first to tenth inventions, including a power accumulation unit for preserving the power supplied from the power acquisition unit.

The twelfth invention for solve the above-mentioned problems is characterized in that, in one of the above-mentioned ninth and eleventh inventions, including a voltage limitation unit for limiting the DC voltage being output by the rectification unit to a voltage of a predetermined value between the rectification unit and the voltage conversion unit.

The thirteenth invention for solve the above-mentioned problems is characterized in that, in the above-mentioned twelfth invention, the voltage limitation unit is configured of a Zener diode.

The fourteenth invention for solve the above-mentioned problems is characterized in that, in one of the above-mentioned tenth to thirteenth inventions, the voltage conversion unit, when the voltage lower than a predetermined voltage is input, steps up the input voltage to its predetermined voltage, and when the voltage higher than a predetermined voltage is input, steps down the input voltage to its predetermined voltage.

The fifteenth invention for solve the above-mentioned problems is characterized in that, in one of the above-mentioned tenth to fourteenth inventions, when the voltage conversion unit is configured to step down the DC voltage from the rectification unit, the power acquisition unit adjusts the AC voltage, which is supplied to the voltage conversion unit by the rectification unit, so that it becomes a voltage higher than an output voltage of the voltage conversion unit, and outputs the set-up voltage to the rectification unit.

The sixteenth invention for solve the above-mentioned problems is characterized in that, in one of the above-mentioned eleventh to fifteenth inventions, including:
  a turning-off detection unit for detecting that the fluorescent lamp has been turned off; and
  a discharge unit for causing the power accumulation unit to discharge the power preserved therein when the turning-off detection unit detects that the fluorescent lamp has been turned off.

The seventeenth invention for solve the above-mentioned problems is characterized in that, in the above-mentioned sixteenth invention, the turning-off detection unit monitors an output voltage of the power acquisition unit, and determines that the fluorescent lamp has been turned off when the above output voltage becomes lower than a predetermined voltage.

The eighteenth invention for solve the above-mentioned problems is characterized in that, in the above-mentioned sixteenth invention, the turning-off detection unit monitors an output voltage of the rectification unit, and determines that the fluorescent lamp has been turned off when its output voltage becomes lower than a predetermined voltage.

The nineteenth invention for solve the above-mentioned problems is characterized in that, in the above-mentioned sixteenth invention, the turning-off detection unit monitors an output voltage of the voltage conversion unit, and determines that the fluorescent lamp has been turned off when its output voltage becomes lower than a predetermined voltage.

The twentieth invention for solve the above-mentioned problems is characterized in, in one of the above-mentioned eleventh to fifteenth inventions:
  including a turning-off detection unit for detecting that the fluorescent lamp has been turned off; and
  that when the turning-off detection unit detects that the fluorescent lamp has been turned off, the power accumulation unit starts to supply the accumulated power.

The twenty-first invention for solve the above-mentioned problems is characterized in that, in the above-mentioned eleventh invention, including a power supply control unit for, when detecting predetermined sensor information, causing the power accumulation unit to start a supply of the power to an external appliance.

The twenty-second invention for solve the above-mentioned problems is characterized in, in the above-mentioned eleventh invention, including a power supply control unit for, when detecting predetermined sensor information, or at a predetermined time interval, causing the power accumulation unit to start a supply of the power to an external appliance.

The twenty-third invention for solve the above-mentioned problems is characterized in that, in one of the above-mentioned twenty-first and twenty-second inventions, the sensor information is information as to whether or not a person exists.

The twenty-fourth invention for solve the above-mentioned problems, which is an lighting system, is characterized in including:
  a lighting equipment; and
  a power acquisition unit for acquiring a power by utilizing a magnetic field that is generated by a current for turning on a fluorescent lamp of the lighting equipment.

The twenty-fifth invention for solve the above-mentioned problems is characterized in that, in the above-mentioned twenty-fourth invention, when the fluorescent lamp is a fluorescent lamp that is turned on by an alternating current of which a frequency is higher than that of a commercial power supply, the power acquisition unit acquires the power with an electromagnetic induction from the magnetic field that is generated by the alternating current.

The twenty-sixth invention for solve the above-mentioned problems is characterized in that, in one of the above-mentioned twenty-fourth and twenty-fifth inventions, the power acquisition unit is a coil.

The twenty-seventh invention for solve the above-mentioned problems is characterized in that, in one of the above-mentioned twenty-fourth to twenty-sixth inventions, the power acquisition unit is configured of a magnetic material and a coil wound onto this magnetic material.

The twenty-eighth invention for solve the above-mentioned problems is characterized in that, in the above-mentioned twenty-seventh invention, the magnetic material is ring-shaped.

The twenty-ninth invention for solve the above-mentioned problems is characterized in that, in one of the above-mentioned twenty-seventh and twenty-eighth inventions, the magnetic material is mounted so as to encircle a fluorescent tube of the fluorescent lamp.

The thirtieth invention for solve the above-mentioned problems is characterized in that, in one of the above-mentioned twenty-seventh and twenty-eighth inventions, the magnetic material is mounted so as to encircle an electric wire for supplying a current for turning on the fluorescent lamp.

The thirty-first invention for solve the above-mentioned problems is characterized in that, in one of the above-mentioned twenty-seventh to thirtieth inventions, the magnetic material is configured of a plurality of magnetic materials.

The thirty-second invention for solve the above-mentioned problems is characterized in, in one of the above-mentioned twenty-fourth to thirty-first inventions, including a rectification unit for rectifying an AC voltage supplied from the power acquisition unit into a DC voltage.

The thirty-third invention for solve the above-mentioned problems is characterized in, in the above-mentioned thirty-second invention, including a voltage conversion unit for converting the DC voltage supplied from the rectification unit into a predetermined voltage.

The thirty-fourth invention for solve the above-mentioned problems is characterized in that, in one of the above-mentioned twenty-fourth to thirty-third inventions, including a power accumulation unit for preserving the power supplied from the power acquisition unit.

The thirty-fifth invention for solve the above-mentioned problems is characterized in that, in one of the above-mentioned thirty-second and thirty-fourth inventions, including a voltage limitation unit for limiting the DC voltage being output by the rectification unit to a voltage of a predetermined value between the rectification unit and the voltage conversion unit.

The thirty-sixth invention for solve the above-mentioned problems is characterized in that, in the above-mentioned thirty-fifth invention, the voltage limitation unit is configured of a Zener diode.

The thirty-seventh invention for solve the above-mentioned problems is characterized in that, in one of the above-mentioned thirty-third to thirty-sixth inventions, the voltage conversion unit, when the voltage lower than a predetermined voltage is input, steps up the input voltage to its predetermined voltage, and when the voltage higher than a predetermined voltage is input, steps down the input voltage to its predetermined voltage.

The thirty-eighth invention for solve the above-mentioned problems is characterized in that, in one of the above-mentioned thirty-third to thirty-seventh inventions, when the voltage conversion unit is configured to step down the DC voltage from the rectification unit, the power acquisition unit adjusts the AC voltage, which is supplied to the voltage conversion unit by the rectification unit, so that it becomes a voltage higher than an output voltage of the voltage conversion unit, and outputs the set-up voltage to the rectification unit.

The thirty-ninth invention for solve the above-mentioned problems is characterized in that, in one of the above-mentioned thirty-fourth to thirty-eighth inventions, including:

a turning-off detection unit for detecting that the fluorescent lamp has been turned off; and a discharge unit for causing the power accumulation unit to discharge the power preserved therein when the turning-off detection unit detects that the fluorescent lamp has been turned off.

The fortieth invention for solve the above-mentioned problems is characterized in that, in the above-mentioned thirty-ninth invention, the turning-off detection unit monitors an output voltage of the power acquisition unit, and determines that the fluorescent lamp has been turned off when the above output voltage becomes lower than a predetermined voltage.

The forty-first invention for solve the above-mentioned problems is characterized in that, in the above-mentioned thirty-ninth invention, the turning-off detection unit monitors an output voltage of the rectification unit, and determines that the fluorescent lamp has been turned off when its output voltage becomes lower than a predetermined voltage.

The forty-second invention for solve the above-mentioned problems is characterized in that, in the above-mentioned thirty-ninth invention, the turning-off detection unit monitors an output voltage of the voltage conversion unit, and determines that the fluorescent lamp has been turned off when its output voltage becomes lower than a predetermined voltage.

The forty-third invention for solve the above-mentioned problems is characterized in, in one of the above-mentioned thirty-fourth to thirty-eighth inventions: including a turning-off detection unit for detecting that the fluorescent lamp has been turned off; and that when the turning-off detection unit detects that the fluorescent lamp has been turned off, the power accumulation unit starts to supply the accumulated power.

The forty-fourth invention for solve the above-mentioned problems is characterized in that, in the above-mentioned thirty-fourth invention, including a power supply control unit for, when detecting predetermined sensor information, causing the power accumulation unit to start a supply of the power to an external appliance.

The forty-fifth invention for solve the above-mentioned problems is characterized in, in the above-mentioned thirty-fourth invention, including a power supply control unit for, when detecting predetermined sensor information, or at a predetermined time interval, causing the power accumulation unit to start a supply of the power to an external appliance.

The forty-sixth invention for solve the above-mentioned problems is characterized in that, in one of the above-mentioned forty-fourth and forty-fifth inventions, the sensor information is information as to whether or not a person exists.

The forty-seventh invention for solving the above-mentioned problems is characterized in, in one of the above-mentioned twenty-fourth to forty-sixth inventions, including:

a capturing unit for capturing an image data by employing the power being supplied from the power acquisition unit; and a wireless unit for transmitting the captured image data by employing the power being supplied from the power acquisition unit.

The forty-eighth invention for solving the above-mentioned problems is characterized in, in one of the above-mentioned twenty-fourth to forty-sixth inventions, including:

a capturing unit for capturing an image data by employing the power being supplied from the power acquisition unit;

a storage for storing the captured image data; and a wireless unit for transmitting the image data of the storage by employing the power being supplied from the power acquisition unit The forty-ninth invention for solving the above-mentioned problems is characterized in, in one of the above-mentioned forty-seventh and forty-eighth inventions, including:

a wireless base station for transmitting the transmitted image data to a monitoring server; and a server for accumulating the image data from the wireless base station.

The fiftieth invention for solving the above-mentioned problems, which is a power supply circuit, is characterized in including:

a power acquisition unit for acquiring a power by utilizing a magnetic field that is generated by a current for turning on a fluorescent lamp; and an interface for connecting a transmitter for transmitting a signal by employing the acquired power.

The fifty-first invention for solve the above-mentioned problems is characterized in that, in the above-mentioned fiftieth invention, when the fluorescent lamp is a fluorescent lamp that is turned on by an alternating current of which a frequency is higher than that of a commercial power supply, the power acquisition unit acquires the power with an electromagnetic induction from the magnetic field that is generated by the alternating current.

The fifty-second invention for solve the above-mentioned problems, which is an lighting system, characterized in including:

a lighting equipment;

a power acquisition unit for acquiring a power by utilizing a magnetic field that is generated by a current for turning on a fluorescent lamp of the lighting equipment; and an interface for connecting the electric appliance that operates by employing the acquired power.

The fifty-third invention for solve the above-mentioned problems is characterized in that, in the above-mentioned fifty-second invention, when the fluorescent lamp is a fluorescent lamp that is turned on by an alternating current of which a frequency is higher than that of a commercial power supply, the power acquisition unit acquires the power with an electromagnetic induction from the magnetic field that is generated by to the alternating current.

An Advantageous Effect of the Invention

The present invention makes it possible to reduce the cost for installing the power supply in an in-house.

The reason is that acquisition of the power from existing lighting facilities is enabled without doing a work for laying out the power supply.

DESCRIPTION OF NUMERALS

A1 lighting equipment
A2 power supply circuit
A3 electrical ballast
A4 fluorescent lamp
A5 energy acquisition unit
A6 energy acquisition unit connection interface
A7 external appliance connection interface
A8, AA1, AC1, AD1, and AE1 internal circuits
B1, J2_1, and J2_2 magnetic materials
B2, G2, I1, and J1 coils
B3 fluorescent tube
D1 rectification unit
D2 voltage conversion unit
E1 power accumulation unit
I2 direction of a magnetic field
J3 round pin
J4 clamp
AA2 voltage limitation unit
AC2 discharge unit
AC3 turning-off detection unit
AD2, AE2, and AJ2 supply control units
AD3 Li-ion battery
AD4 switch
AE3 person-sensing sensor
AF1 lighting equipment
AF2, AI1, AJ1 camera nodes
AF3 power supply circuit
AH1 control unit
AH2 CCD camera
AH3 wireless communication unit
AJ3 timer
AJ4 memory

BEST MODE FOR CARRYING OUT THE INVENTION

A first embodiment of the present invention will be explained in details by making a reference to the accompanied drawings.

Figure 1:
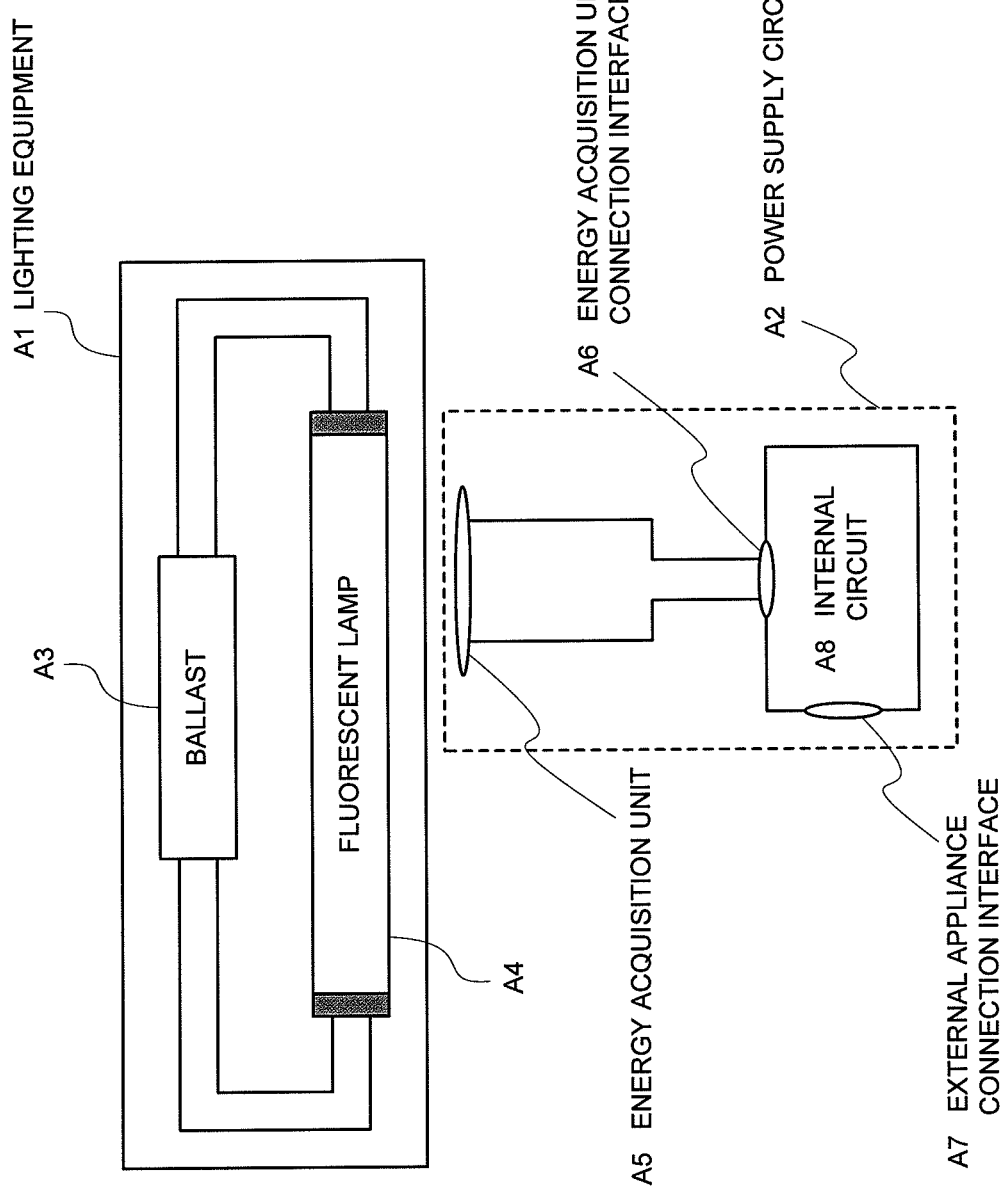
FIG. 1 is a view illustrating functional blocks of a lighting equipment A1 and a power supply circuit A2 in a first embodiment.

FIG. 1 is a block diagram illustrating functional blocks of a lighting equipment A1 and a power supply circuit A2, each of which is a component of the lighting system in the present invention.

A ballast A3 supplies an alternating current to a fluorescent lamp A4, and the fluorescent lamp A4 is turned on with the supplied alternating current.

The power supply circuit A2 includes an energy acquisition unit A5 and an internal circuit A8. The energy acquisition unit A5 and the internal circuit A8 are connected via an energy acquisition unit connection interface A6, and the internal circuit A8 and an external appliance are connected via an external appliance connection interface A7.

The energy acquisition unit A5 acquires energy by utilizing a magnetic field that is generated by the alternated current flowing inside the fluorescent lamp A4, and conveys the acquired energy to the internal circuit A8 via the energy acquisition unit connection interface A6.

The internal circuit A8 generates a voltage and a current necessary for driving the external appliance from the energy conveyed via the energy acquisition unit connection interface A6, and supplies the generated voltage and current to the external appliance via the external appliance connection interface A7.

Additionally, various types of electronic appliances can be envisaged as an external appliance, and the following explanation is made by envisaging the transmitter for transmitting the micro radio waves such as Bluetooth and RFID and the transmitter for transmitting the infrared rays.

Modification Example 1

A coil is thinkable as a specific example of the energy acquisition unit A5.

Figure 2:
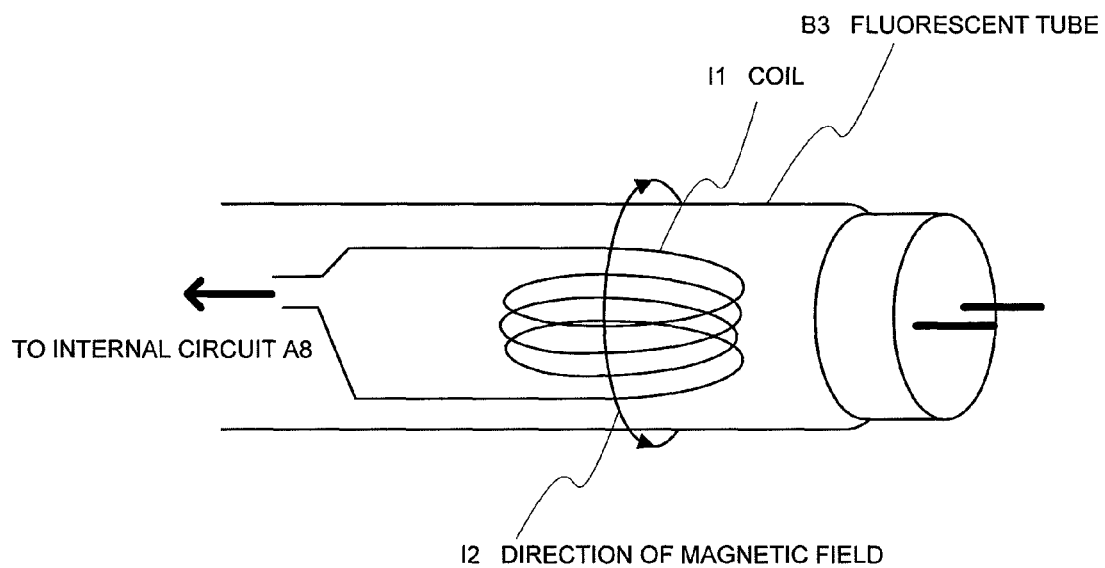
FIG. 2 is a view illustrating a structure of an energy acquisition unit A5 in a modification example 1 of the first embodiment.

FIG. 2 is a view illustrating a configuration of the energy acquisition unit A5 in this modification example.

The alternating current flowing in a fluorescent tube B3 generates a magnetic field in a direction shown by I2. A coil is installed in a side of the fluorescent tube B3 so that the magnetic field that is generated by the alternating current flowing in the fluorescent tube B3 penetrates a center of this coil I1. And, a change in the magnetic field penetrating this coil I1 generates an induced electromotive force. The induced electromotive force generated in such a manner is supplied to the internal circuit A8.

Additionally, the number of turns of the coil I1 of FIG. 2 is four; however the number of turns, which could be four or less, or four or more, is optional.

Figure 3:
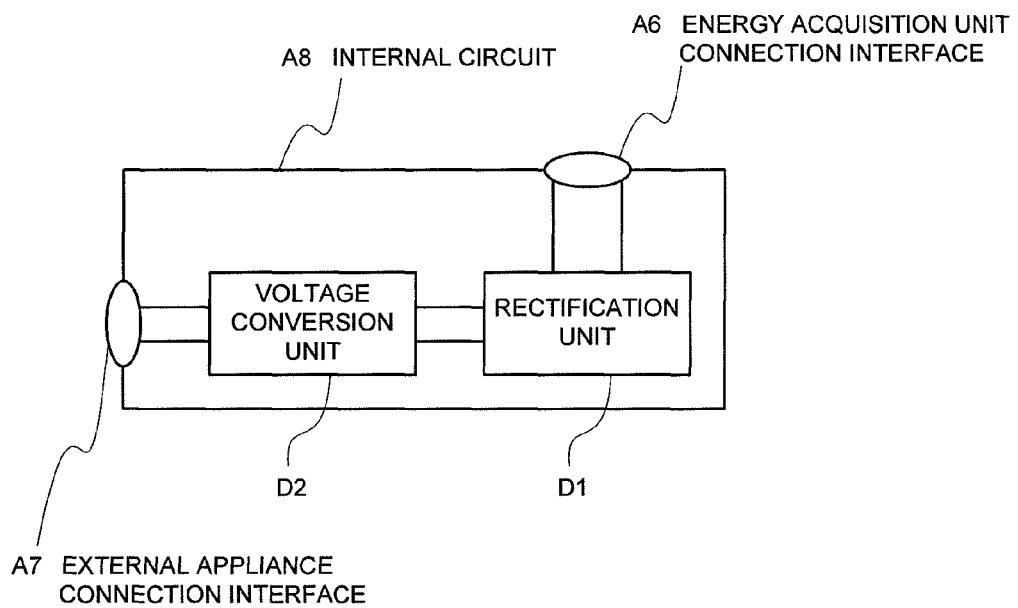
FIG. 3 is a view illustrating a structure of an internal circuit A8 in the modification example 1 of the first embodiment.

FIG. 3 is a view illustrating a configuration of the internal circuit A8 in this modification example.

The internal circuit A8 includes a rectification unit D1 and a voltage conversion unit D2. The internal circuit A8 is connected with the energy acquisition unit A5 via the energy acquisition unit connection interface A6. Further, the internal circuit A8 is connection with the external appliance via the external appliance connection interface A7.

The rectification unit D1 rectifies the AC voltage acquired from the energy acquisition unit A5 via the energy acquisition unit connection interface A6, and generates a DC voltage. The generated DC voltage is conveyed to the voltage conversion unit D2, and the voltage conversion unit D2 converts the voltage into a pre-decided value, and supplies the converted voltage to the external appliance via the external appliance connection interface A7.

Modification Example 2

A coil, which has the magnetic material taking a round about the fluorescent tube portion of the fluorescent lamp as a core, is thinkable as another specific example of the energy acquisition unit A5. In this modification example, the case that the energy acquisition unit A5 is a coil, which has the magnetic material taking a round about the fluorescent tube portion of the fluorescent lamp as a core, will be explained.

Figure 4:
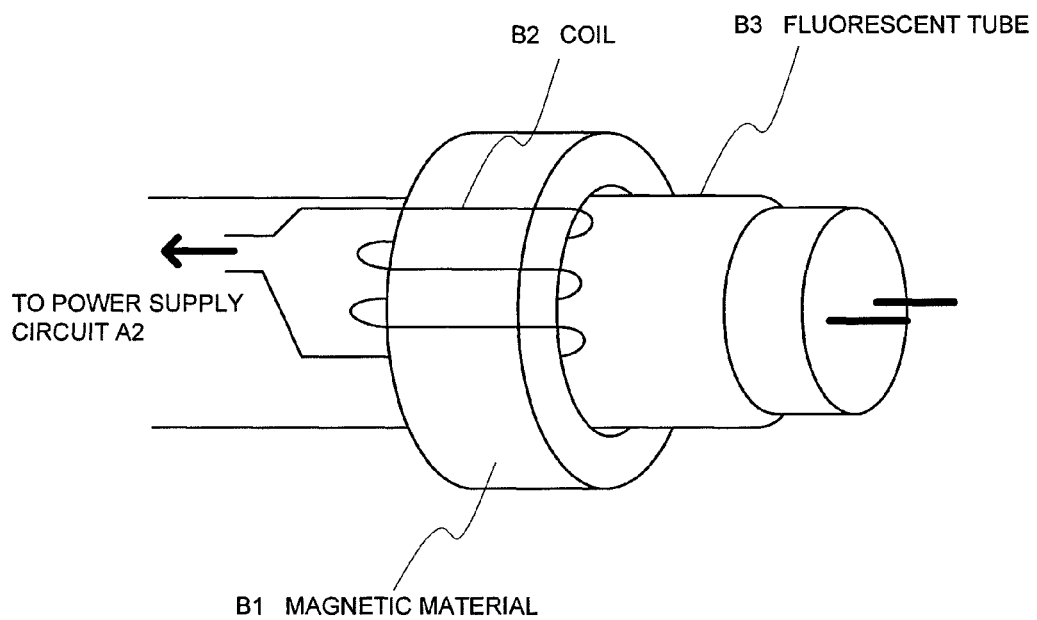
FIG. 4 is a view illustrating a structure of an energy acquisition unit A5 in the modification example 2 of the first embodiment.

FIG. 4 is a view illustrating a configuration of the energy acquisition unit in this modification example.

A magnetic material B1 is installed so as to encircle the fluorescent tube B3, and by winding a copper wire round this magnetic material B1, a coil B2 is configured.

The alternating current flows inside the fluorescent lamp A4. This causes a density of magnetic flux flowing through the magnetic material B1 to change, and the coil B2 generates the induced electromotive force. The induced electromotive force generated in such a manner is supplied to the internal circuit A8.

The drawing of this embodiment shows the case that the magnetic material is cylindrical; however the shape of the magnetic material could be a shape other than the cylindrical shape so long as the magnetic material can be installed so as to take a round about the fluorescent tube.

Further, the number of turns of the coil B2 is three; however the number of turns, which could be three or less, or three or more, is optional.

Modification Example 3

It is also envisaged that the external appliance of a type, which has small averaged power consumption, but momentarily demands a large quantity of the current, is connected with the power supply circuit A2. In such a case, a possibility that a supply capacity of the power supply circuit A2 is temporarily exceeded and the sufficient current cannot be supplied is thinkable. Thereupon, in this modification example, the case will be explained of employing a power accumulation unit as a component so that the sufficient current can be supplied even though the appliance of a type, which momentarily demands a large quantity of the current, is connected.

Figure 5:
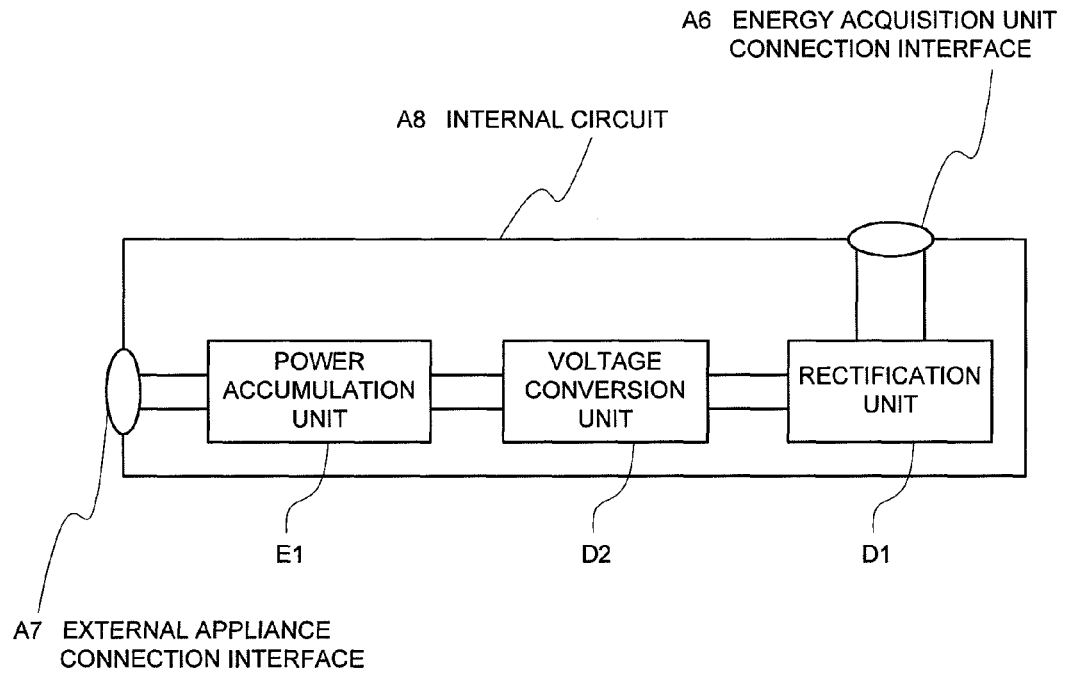
FIG. 5 is a view illustrating a functional block of an internal circuit A8 in a modification example 3 of the first embodiment.

FIG. 5 is a view illustrating a configuration of an internal circuit A8 in this modification example.

The internal circuit A8 includes a rectification unit D1, a voltage conversion unit D2, and a power accumulation unit E1. Additionally, a function of each of the rectification unit D1 and the voltage conversion unit D2 is identical to that of the modification example 1, so its explanation is omitted.

The power accumulation unit E1, which is configured of a condenser, is charged when the external appliance does not demand a large power, and the electricity thereof is discharged at one stretch when the external appliance needs the power, thereby enabling a large power to be momentarily supplied to the external appliance.

Modification Example 4

The energy that the energy acquisition unit A5 can acquire is in proportional to an amplitude and a frequency of the alternating current that is supplied to the fluorescent lamp A4 by the ballast A3. Further, there exist various kinds of the ballasts A3, and the amplitude and the frequency of the alternating current that is supplied to the fluorescent lamp A4 fluctuate depending upon the ballast A3.

For example, with the voltage conversion unit D2, which has been designed to the ballast A3 that supplies the alternating current of which the amplitude is small and of which the frequency is also low to the fluorescent lamp A4, a possibility that the above voltage conversion unit D2 breaks because the voltage being output by the rectification unit D1 of the power supply circuit A2 becomes high exists in a case where the energy acquisition unit A5 has acquired the energy from the fluorescent lamp that has been turned on by the ballast A3 of which the amplitude is large and of which the frequency is high. Thereupon, in this modification example, a configuration will be explained in which a function has been added of protecting the voltage conversion unit D2 also in a case of acquiring the power from the fluorescent lamp A4 that has been turned on by the alternating current having a high amplitude and a high frequency, which is supplied by the ballast A3.

Figure 10:
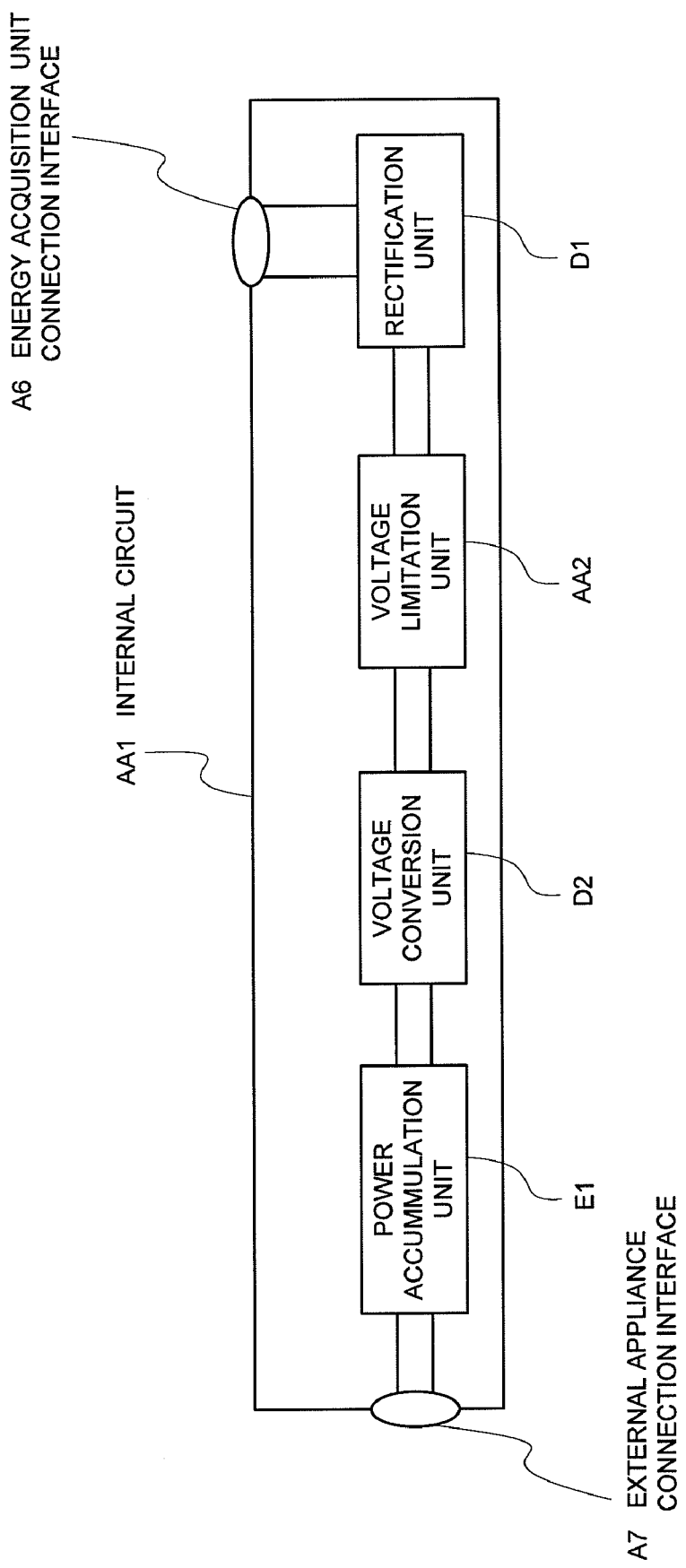
FIG. 10 is a view illustrating a functional block of an internal circuit AA1 in a modification example 4 of the first embodiment.

FIG. 10 is a view illustrating a configuration of an internal circuit AA1 in this modification example.

The internal circuit AA1 includes a rectification unit D1, a voltage limitation unit AA2, a voltage conversion unit D2, and a power accumulation unit E1. Additionally, a function of each of the rectification unit D1 and the voltage conversion unit D2 is identical to that of the modification example 1, and a function of the power accumulation unit E1 is identical to that of the modification 3, so its explanation is omitted.

The voltage limitation unit AA2, which is configured of a Zener diode, suppresses the voltage at a level of a predetermined voltage when the voltage higher than the predetermined voltage has been supplied from the rectification unit D1, and prevents the voltage higher than the predetermined voltage from being input into the voltage conversion unit D2.

Modification Example 5

As described in the above-mentioned modification example 4, there exist various kinds of the ballasts A3, and the amplitude and the frequency of the alternating current that is supplied to the fluorescent lamp A4 fluctuate depending upon the ballast A3. For this, the value as well of the DC voltage being output by the rectification unit D1 fluctuates, so not only the case of the voltage higher than an output voltage of the voltage conversion unit D2 set for the voltage conversion unit D2 but also the case of the voltage lower than an output voltage is thinkable. By taking into consideration the fact that, in such a manner, the voltage being input into the voltage conversion unit D2 becomes higher than the output voltage in some cases and becomes lower in some cases, with the voltage conversion unit D2, it is thinkable to utilize a step-up/step-down DC/DC converter, which steps up the voltage when the input voltage is lower than the output voltage, and steps down the voltage when the input voltage is higher, as a voltage conversion unit.

Additionally, so as to protect the step-up/step-down DC/DC converter that is utilized as the voltage conversion unit D2, it may be used in combination with the voltage limitation unit AA2 described in the modification example 4.

Modification Example 6

As described in the modification examples 4 and 5, there exist various kinds of the ballasts A3, and the amplitude and the frequency of the alternating current that is supplied to the fluorescent lamp A4 fluctuate depending upon the ballast A3. For this, the case that the value as well of the AC voltage, which the energy acquisition unit A5 outputs, fluctuates and the DC voltage, which the ballast A3 outputs to the rectification unit D1, falls below a minimum voltage at which the voltage conversion unit D2 can step up the voltage depending upon the ballast A3 is thinkable. Thereupon, in this modification example, a configuration, which envisages such a case, will be explained.

Figure 11:
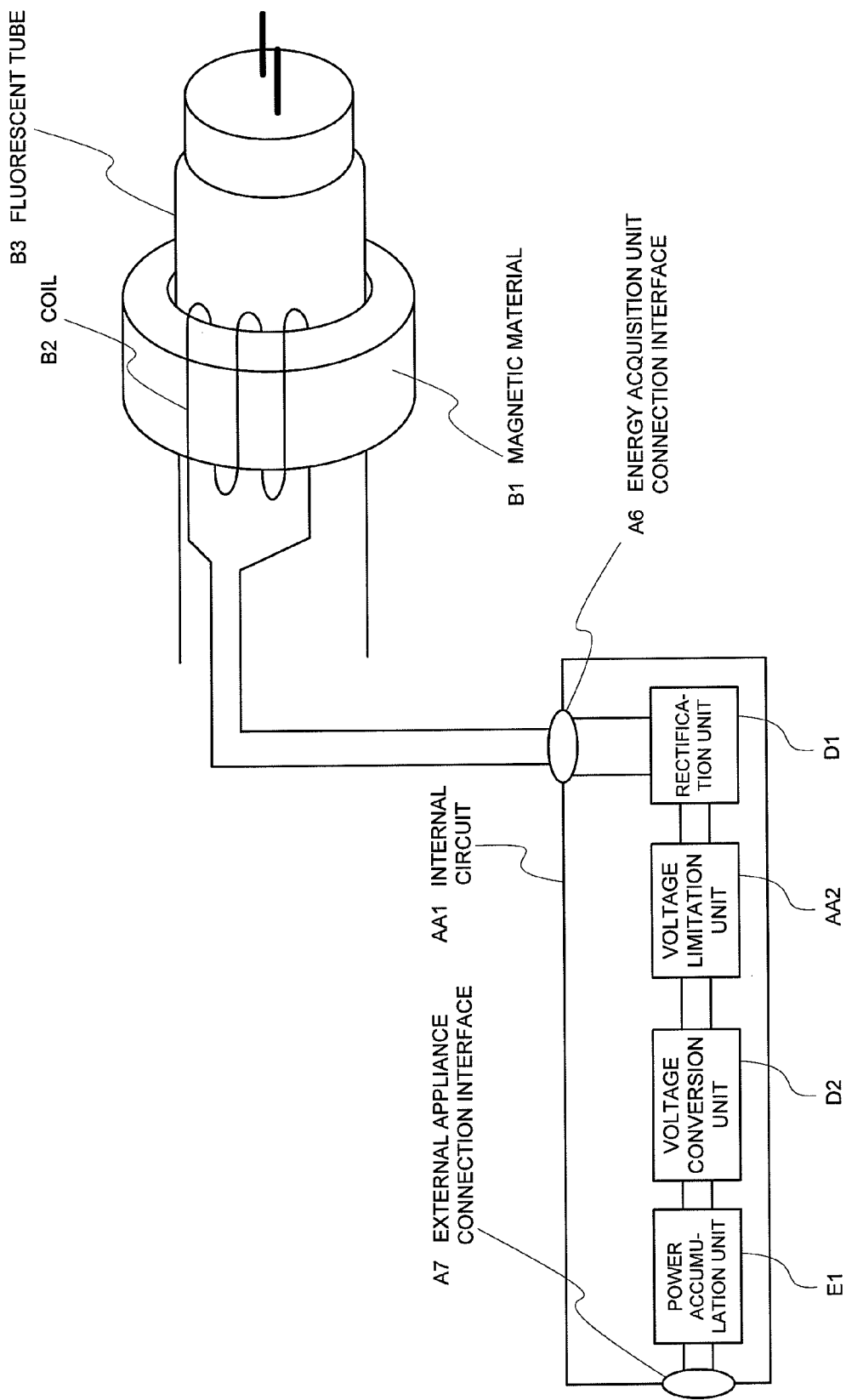
FIG. 11 is a view illustrating a configuration of the power supply circuit A2 in a modification example 6 of the first embodiment.

FIG. 11 is a view illustrating a configuration of a power supply circuit A2 in this modification example.

The power supply circuit A2 is configured of a magnetic material B1, a coil B2, a rectification unit D1, a voltage limitation unit AA2, a voltage conversion unit D2, and a power accumulation unit E1. Additionally, a function of the magnetic material B1 is identical to that of the modification example 2, and a function of the power accumulation unit E1 is identical to that of the modification 3, so its explanation is omitted.

The voltage conversion unit D2, which is a DC/DC converter for stepping down the voltage that was input, or a regulator, is designed on the assumption that the voltage higher than a predetermined output voltage is input. Additionally, for explanation, the output voltage has been decided to be 3.3 V. Further, it is assumed that a maximum input voltage is 10 V.

JIS C 7617-2 stipulates that the amplitude (effective value) and the frequency of the current, which is supplied to a fluorescent lamp for an inverter at the time of an illuminating test, are 255 mA and 45 kHz, respectively. Further, the ballast that is commercially available supplies to the fluorescent lamp the alternating current of which the amplitude is larger than a value stipulated under JIS C 7617-2 and of which the frequency is higher. Thereupon, the number of turns of the coil B2 is adjusted so that the amplitude of the AC voltage, which is supplied to the rectification unit D1 during the time that the alternating current stipulated under JIS C 7617-2 is supplied to the fluorescent lamp, becomes 3.3 V or more.

The rectification unit D1 is configured of a full-wave rectification circuit, and the DC voltage being output from the rectification unit D1 become 3.3 V or more. This DC voltage is stepped down in the voltage conversion unit D2, and the DC voltage of 3.3 V is output from the voltage conversion unit D2.

As described previously, the alternating current being supplied to the fluorescent lamp fluctuates depending upon the ballast. For this, it is thinkable that the alternating current of which the amplitude is larger than a value stipulated under JIS C 7617-2, and of which the frequency is higher is supplied, and as the case may be, it is thinkable that the DC voltage, which is output from the rectification unit D1, and is input into the voltage conversion unit D2, becomes 10 V or more. Thereupon, so as to protect the voltage conversion unit D2, a voltage limitation unit AA2 is provided.

The voltage limitation unit AA2 clamps the input voltage to 8 V, being a predetermined voltage, so that the input voltage into the voltage conversion unit D2 does not exceed the maximum input voltage 10 V of the voltage conversion unit D2.

Modification Example 7

In the case that the internal circuit AA1 includes the power accumulation unit E1, the latter preserves the power also after the fluorescent lamp has been turned off, and discharges the power gradually. For this, the voltage that gradually is stepped down has been applied to an output terminal of the voltage conversion unit D2. Thereafter, when the fluorescent lamp is re-turned on, the DC voltage is supplied from the rectification unit D1 to the voltage conversion unit D2, and a predetermined voltage is output from the voltage conversion unit D2.

However, in the case of having utilized the DC/DC converter for the voltage conversion unit D2, or the like, it is thinkable that applying the DC voltage to the output terminal of the voltage conversion D2 from the rectification unit D1 with the voltage having a certain constant level applied to the output terminal causes the voltage conversion unit D2 to take an abnormal action.

In this modification example, a configuration will be explained in which a turning-off detection unit and a discharge unit have been added so as to prevent the voltage conversion unit D2 from taking an abnormal action.

Figure 12:
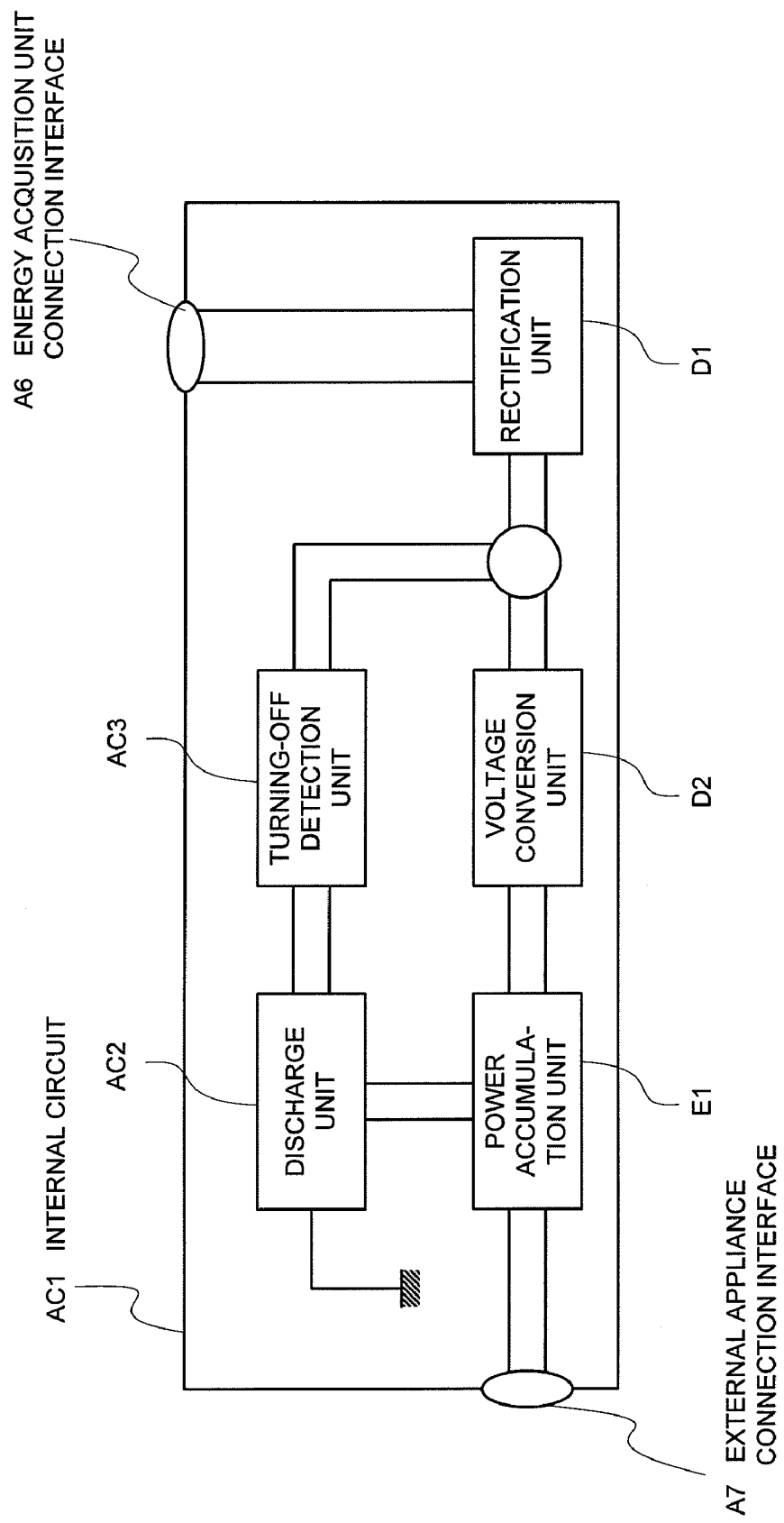
FIG. 12 is a view illustrating a functional block of an internal circuit AC1 in a modification example 7 of the first embodiment.

FIG. 12 is a view illustrating a functional block of an internal circuit AC1 in this modification example.

The internal circuit AC1 includes a rectification unit D1, a voltage conversion unit D2, a power accumulation unit E1, a discharge unit AC2, and a turning-off detection unit AC3. Additionally, a function of each of the rectification unit D1, the voltage conversion unit D2, and the power accumulation unit E1 is identical to that of the modification example 3, so its explanation is omitted herein.

The turning-off detection unit AC3 monitors the voltage that is output by the rectification unit D1 and is input into the voltage conversion unit D2, and transmits a control signal to the discharge unit AC2 when the voltage being monitored falls below a specified value.

Upon receipt of the control signal from the turning-off detection unit, the discharge unit AC2 connects the power accumulation unit E1, which is configured of the condenser, with a ground, and causes it to discharge the preserved power.

Additionally, this modification example was explained by employing the case that the turning-off detection unit AC3 monitored the output voltage of the rectification unit D1; however, with the voltage being monitored, not only the amplitude of the AC voltage being input into the rectification unit but also the output voltage of the voltage conversion unit is acceptable. Further, what the turning-off detection unit AC3 monitors could be a current instead of the voltage.

Modification Example 8

In this modification example, a configuration will be explained in which employing a lithium-ion battery etc. for the power accumulation unit E1 enables the power to continue to be supplied to the external appliance also in a case where the fluorescent lamp has been turned off.

Figure 13:
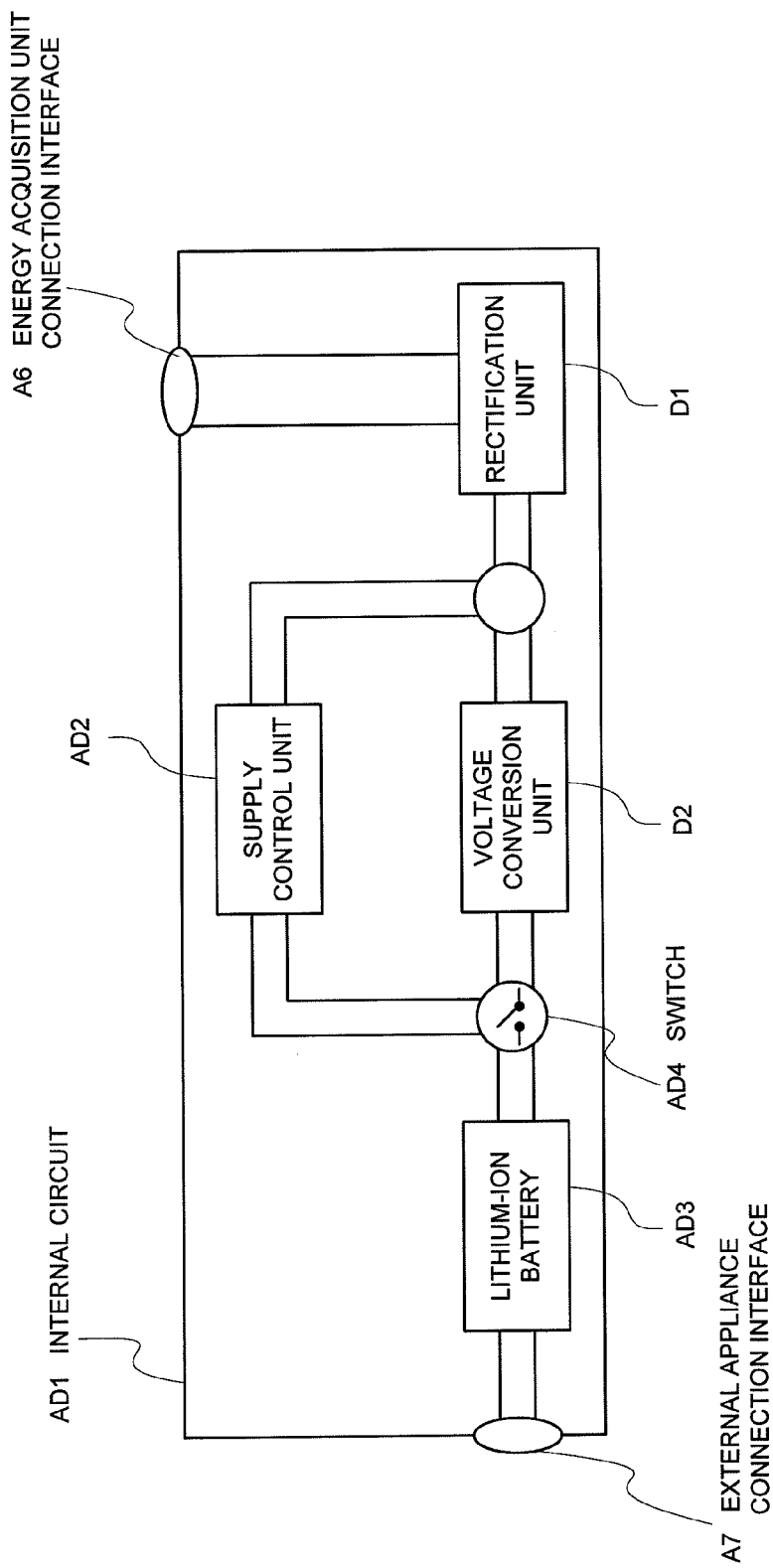
FIG. 13 is a view illustrating a functional block of an internal circuit AD1 in a modification example 8 of the first embodiment.

FIG. 13 is a view illustrating a configuration of an internal circuit AD1 in this modification example.

The internal circuit AD1 is configured of a rectification unit D1, a voltage conversion unit D2, a supply control unit AD2, and a lithium-ion battery AD3. Additionally, a function of each of the rectification unit D1 and the voltage conversion unit D2 is identical to that of the modification example 3, so its explanation is omitted herein.

The supply control unit AD2 has a function of monitoring the voltage that is output by the rectification unit D1 and is input into the voltage conversion unit D2, and operating a switch AD4, and disconnecting the lithium-ion battery AD3 and the voltage conversion unit D2 from each other when the monitored voltage falls below a predetermined value. In addition hereto, it has a function of operating the switch AD4, and connecting the lithium-ion battery AD3 and the voltage conversion unit D2 when the monitored voltage becomes a predetermined value or more.

The lithium-ion battery AD3 supplies the power to the external appliance connected via the external appliance connection interface A7 while it is charged with the power being supplied from the voltage conversion unit D2 during the time that it is in a connection with the voltage conversion unit D2 via the switch AD4. The lithium-ion battery supplies the power with which it has been charged to the external appliance connected via the external appliance connection interface A7 in the case of having been disconnected from the voltage conversion unit D2 by the switch AD4.

When the fluorescent lamp is turned off, the voltage being output by the rectification unit D1 declines, and the supply control unit AD2, which monitors the voltage, detects it. The supply control unit AD2 having detected a decline in the voltage operates the switch AD4, disconnects the lithium-ion battery AD3 and the voltage conversion unit AD2, and the disconnected lithium-ion battery AD3 supplies the power with which it has been charged to the external appliance. When the fluorescent lamp is turned on again, the voltage being output by the rectification unit D1 is stepped up, and the supply control unit AD2, which monitors the voltage, detects it. The supply control unit AD2 having detected a rise in the voltage operates the switch AD4, and connects the lithium-ion battery AD3 and the voltage conversion unit AD2, and the lithium-ion battery AD3 is charged with the voltage being output by the voltage conversion unit D2.

Modification Example 9

In the modification example 8, it was detected whether the fluorescent lamp was turned-off, thereby to switch the method of supplying the power, and in this modification example, a configuration will be explained in which the power supply is controlled by acquiring context information other than the information of turning-off of the fluorescent lamp.

Figure 14:
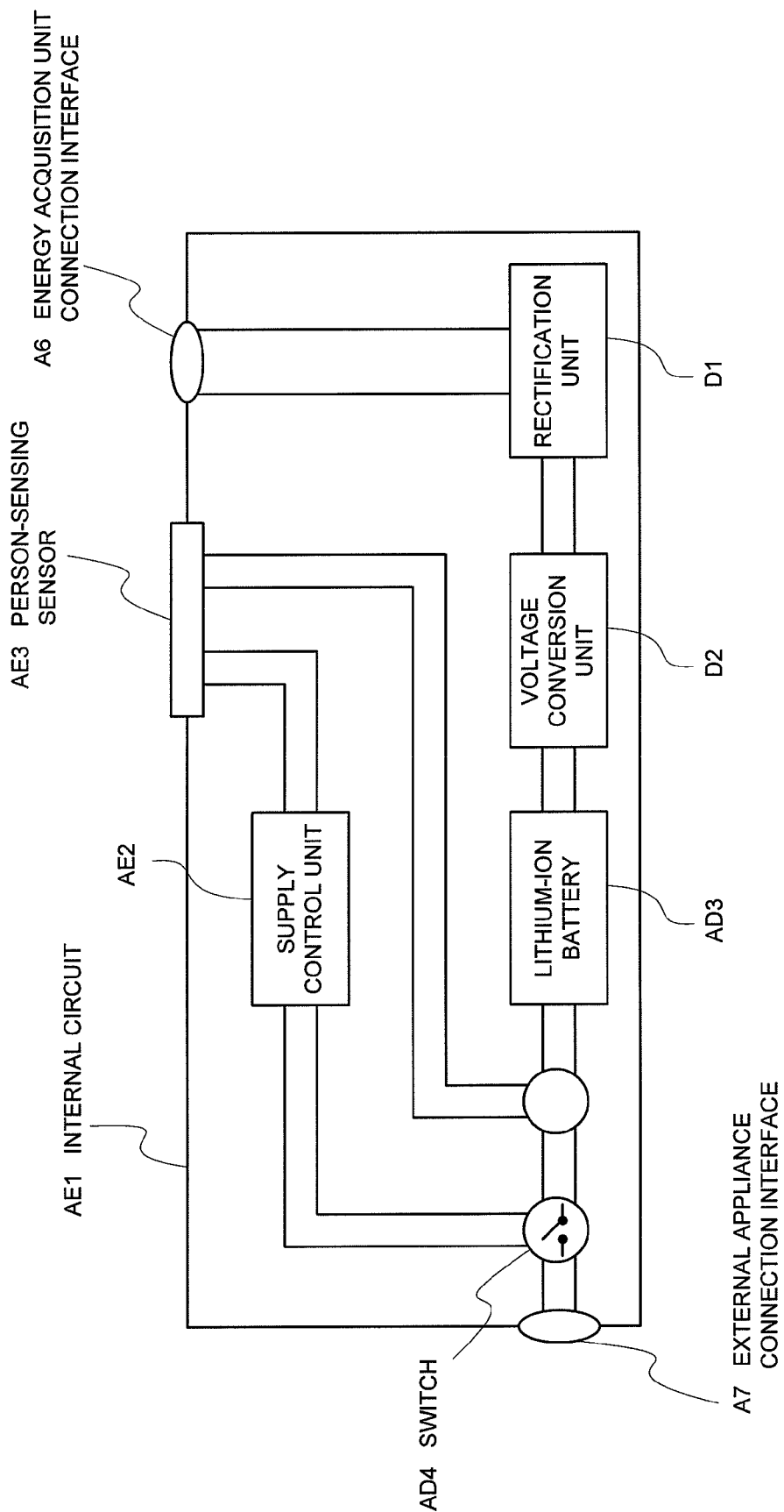
FIG. 14 is a view illustrating a functional block of an internal circuit AE1 in a modification example 9 of the first embodiment.

FIG. 14 is a view illustrating a configuration of an internal circuit AE1 in this modification example.

The internal circuit AE1 is configured of a rectification unit D1, a voltage conversion unit D2, a supply control unit AE2, and a lithium-ion battery AD3. Additionally, a function of each of the rectification unit D1 and the voltage conversion unit D2 is identical to that of the modification example 3, so its explanation is omitted herein.

A person-sensing sensor AE3, which senses existence of a person, applies a predetermined voltage to the supply control unit AE2 when detecting existence of a person.

When the voltage is applied to the supply control unit AE2 from the person-sensing sensor AE3, the supply control unit AE2 operates the switch AD4, and connects the lithium-ion battery AD3 and the external appliance via the external appliance connection interface A7.

Additionally, herein, the explanation is made by envisaging the transmitter for transmitting the micro radio waves such as Bluetooth, RFID and a wireless LAN, or a security camera etc. being installed in a ceiling as an external appliance.

The lithium-ion battery AD3 supplies the power to the external appliance and the person-sensing sensor AE3 while it is charged with the power being supplied from the voltage conversion unit D2 during the time that the fluorescent lamp has been turned on. On the other hand, the lithium-ion battery supplies the power with which it has been charged to the external appliance and the person-sensing sensor AE3 during the time that the fluorescent lamp has been turned off.

Figure 15:
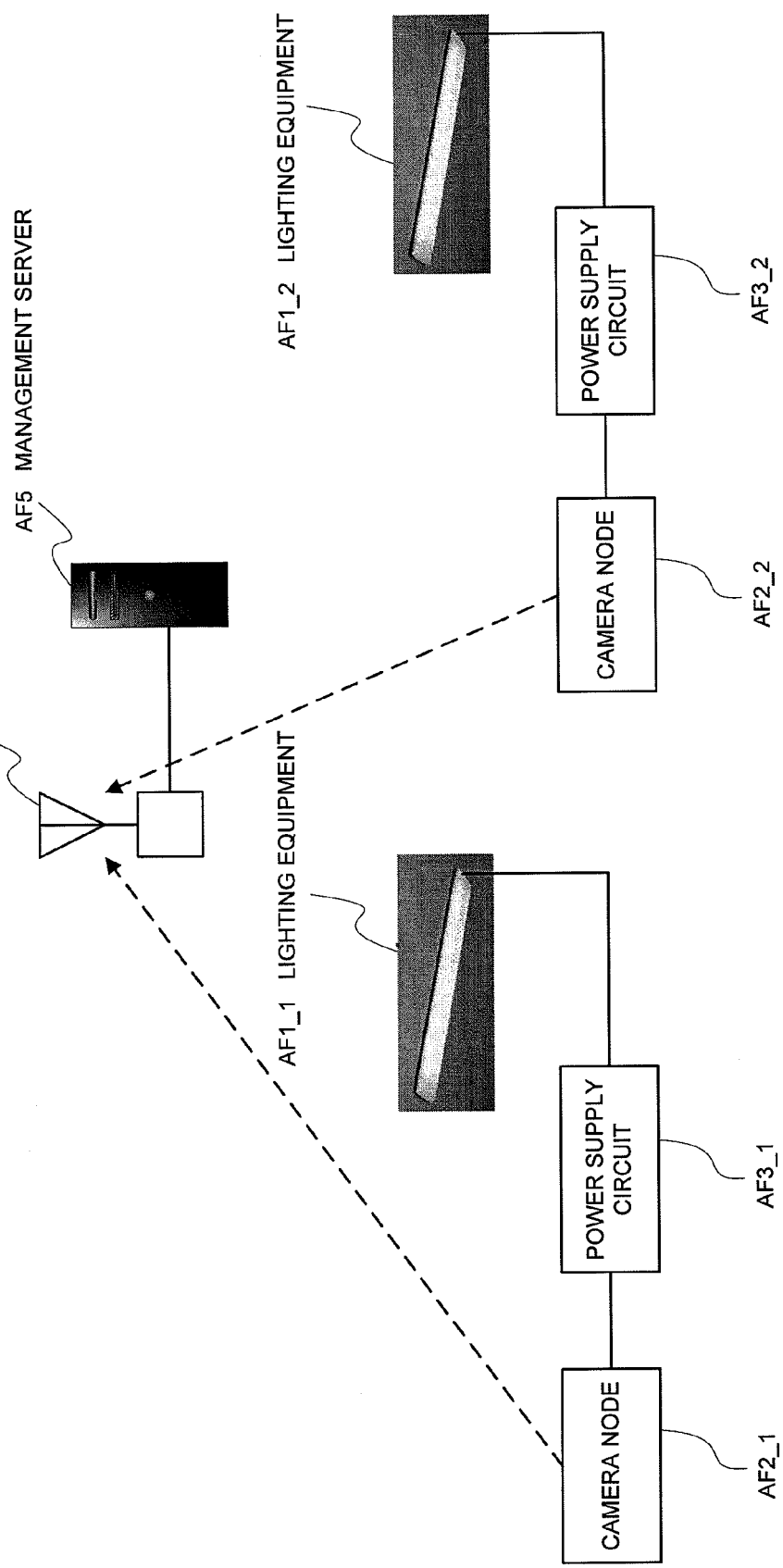
FIG. 15 is a view illustrating a configuration of a monitoring system employing the internal circuit AE1 in the modification example 9 of the first embodiment.

FIG. 15 is a view illustrating a summary of a monitoring system employing the power supply circuit of this modification example.

This system is configured of a camera node AF2, a power supply circuit AF3, a wireless base station AF4, and a monitoring server AF5. Additionally, for a convenience of explanation, only two camera nodes are listed in the drawing; however no limitation to the number of the camera nodes exists. Likewise, no limitation to the number of the wireless base stations AF4 exists.

Figure 16:
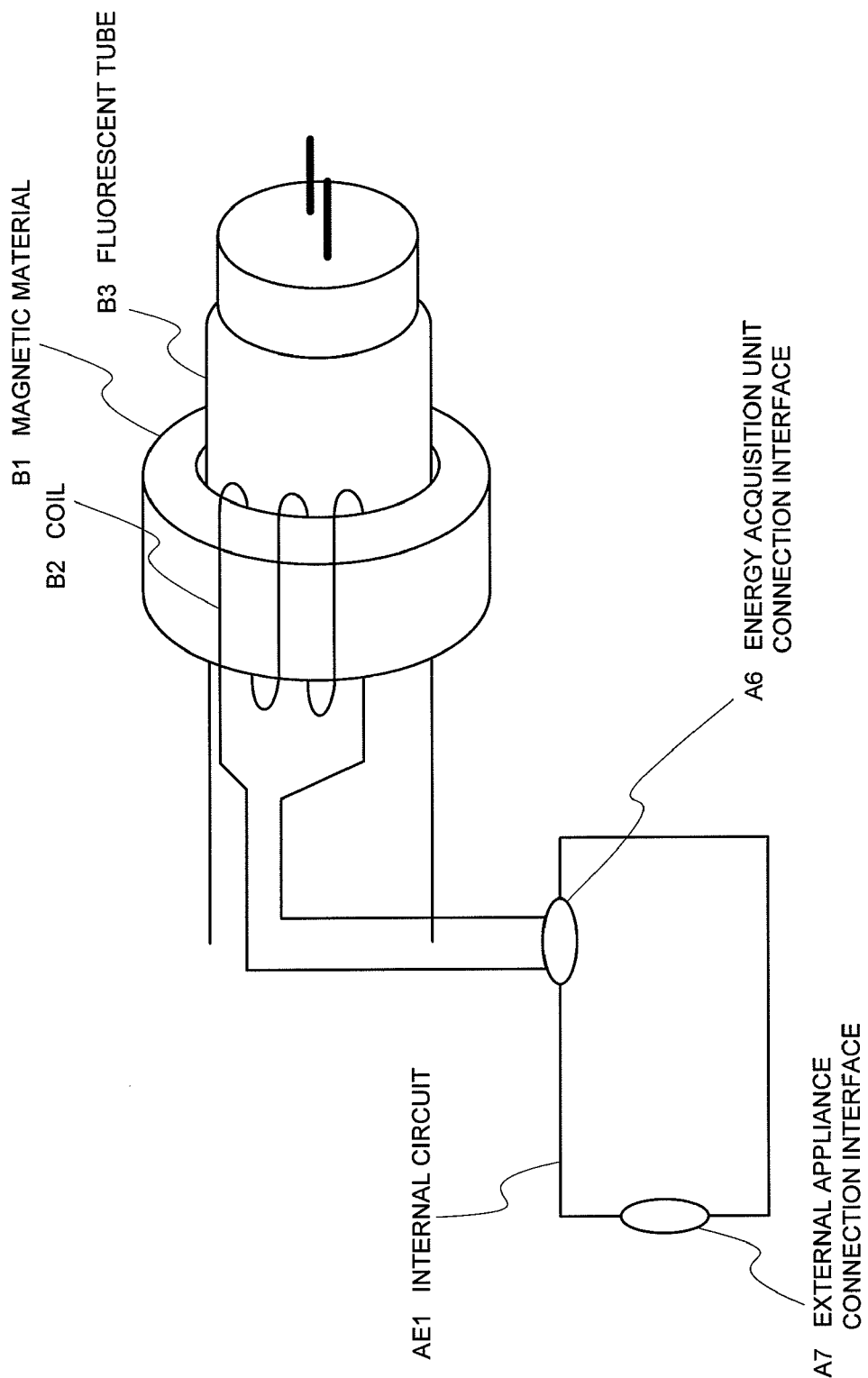
FIG. 16 is a view illustrating a configuration of a power supply circuit AF3 in the modification example 9 of the first embodiment.

FIG. 16 is a view illustrating a configuration of the power supply circuit AF3.

The power supply circuit AF3 is configured of a magnetic material B1, a coil B2, and an internal circuit AE1.

Figure 17:
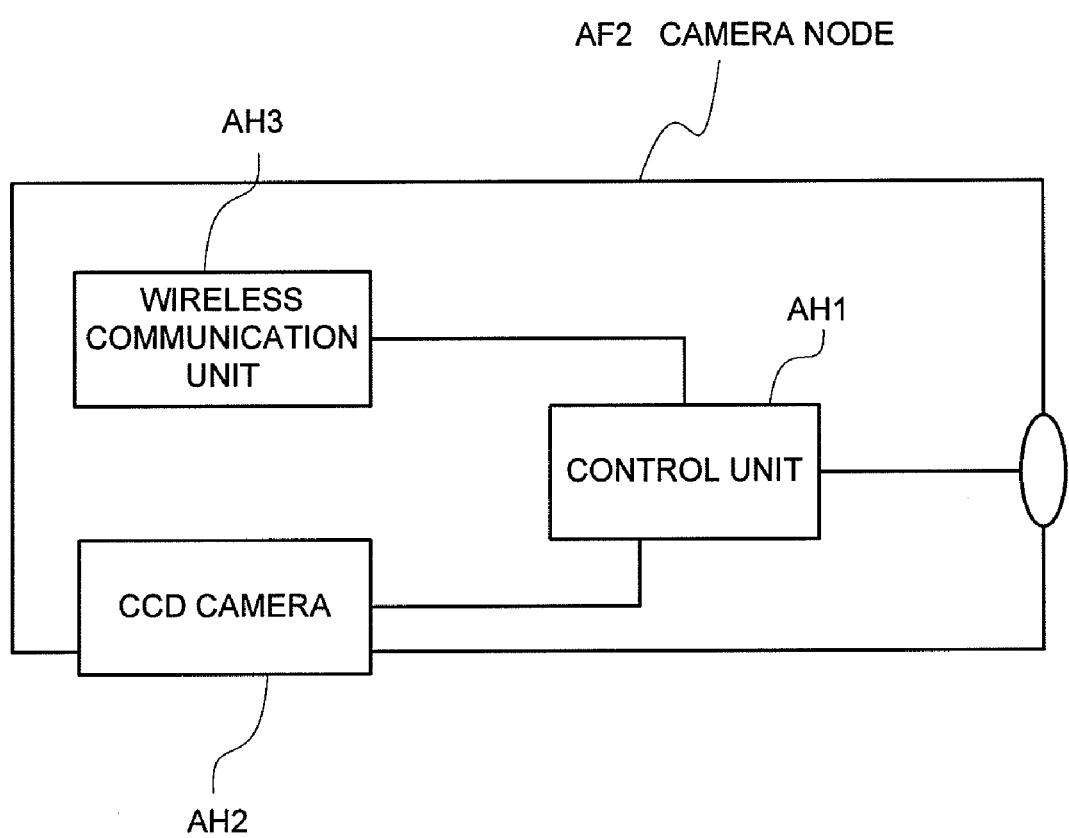
FIG. 17 is a view illustrating a configuration of a camera node AF2 in the modification example 9 of the first embodiment.

FIG. 17 is a view illustrating a configuration of the camera node.

The camera node AF2 is configured of a control unit AH1, a CCD camera AH2, and a wireless communication unit AH3.

When the power is supplied to the control unit AH1 from the power supply circuit AF3 via a power supply circuit connection interface AH5, the control unit AH1 captures an image data by operating the CCD camera AH2, and transmits the captured image data to the wireless base station AF4 via the wireless communication unit AH3 after completing the capturing.

When the wireless base station AF4 receives the image data transmitted from the camera node AF2, it transmits the image data to the monitoring server AF5. The monitoring server AF5 accumulates the data received from the wireless base station AF4, and preserves it in such a status that a administrator can peruses it at any time.

Figure 18:
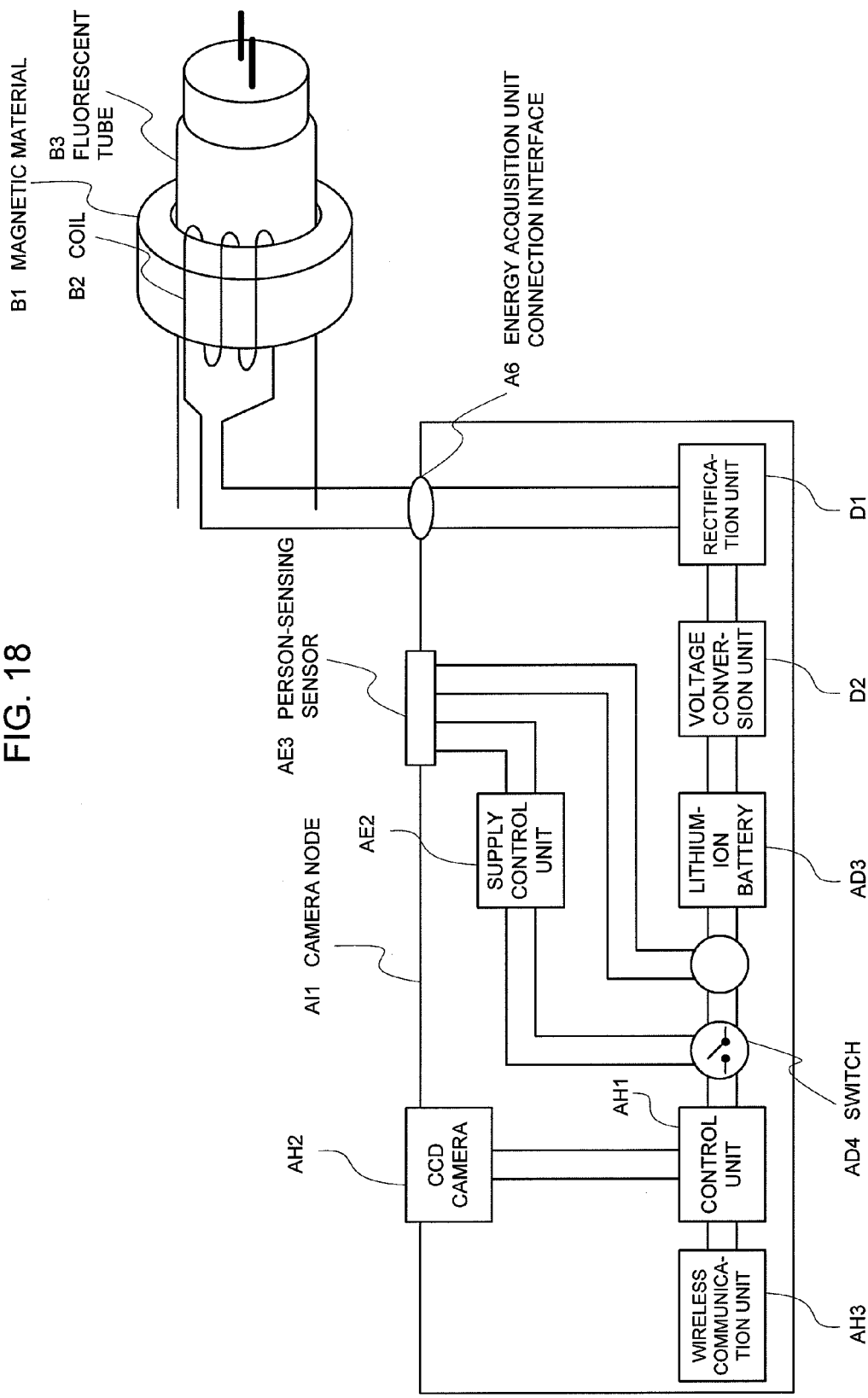
FIG. 18 is a view illustrating a configuration of a camera node AI1 in the modification example 9 of the first embodiment.

Additionally, in this modification example, each of the camera node and the power supply circuit was a separate body; however they may be consolidated into a one-piece body. FIG. 18 is a view illustrating a configuration in which the camera node and the power supply circuit have been consolidated into a one-piece body.

Modification Example 10

In the camera nodes AF2 and AI1 of the modification example 9, the image data captured by the CCD camera AH2 was transmitted to the monitoring server AF5 by employing the wireless communication unit AH3 whenever it was captured. In this modification example, a configuration will be explained in which a memory is provided in the camera node, the captured image data is saved in the memory for the time being, and the memory-saved data is regularly transmitted to the monitoring server.

Figure 19:
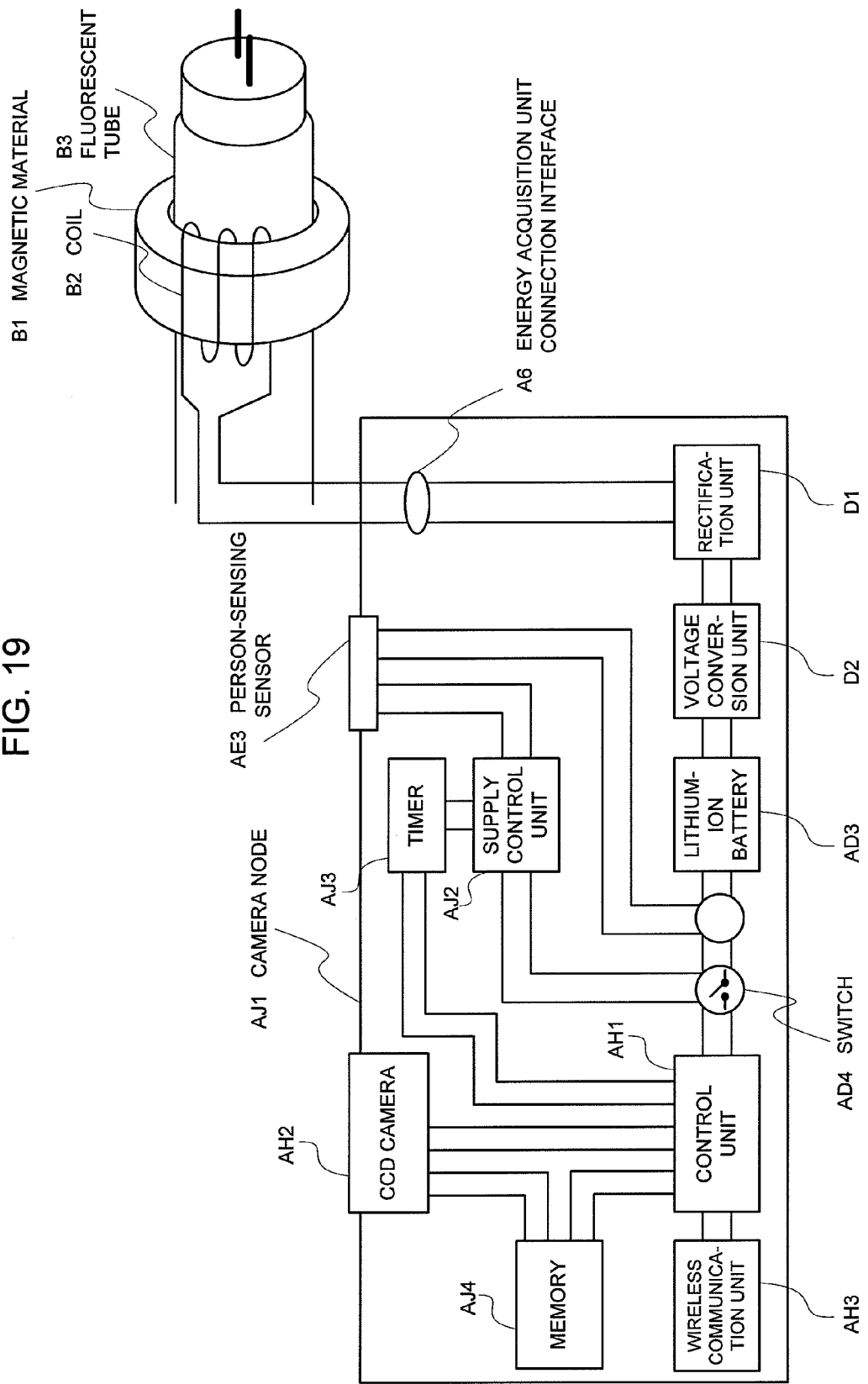
FIG. 19 is a view illustrating a configuration of a camera node AJ1 in a modification example 10 of the first embodiment.

FIG. 19 is a view illustrating a configuration of the camera node of this modification example.

A camera node AJ1 is configured of a control unit AH1, a CCD camera AH2, a wireless communication unit AH3, a memory AJ4, a switch AD4, a lithium-ion battery AD3, a voltage conversion unit D2, a rectification unit D1, a supply control unit AJ2, a timer AJ3, and a person-sensing sensor AE3. Additionally, a function of each of the control unit AH1, the CCD camera AH2, the wireless communication unit AH3, switch AD4, the lithium-ion battery AD3, the voltage conversion unit D2, the rectification unit D1, and the person-sensing sensor AE3 is identical to that of a modification example 11, so its explanation is omitted herein.

The person-sensing sensor AE3, which senses existence of a person, applies a predetermined voltage to the supply control unit AJ2 when detecting existence of a person.

The supply control unit AJ2 to which the voltage has been applied from the person-sensing sensor AE3 operates the switch AD4, and connects the lithium-ion battery AD3 and the control unit AH1, and the control unit AH1 to which the power has been supplied from the lithium-ion battery D3 starts an operation.

When the power is supplied to the control unit AH1 from the lithium-ion battery AD3, the former operates the CCD camera AH2, and captures an image data, and stores the captured image data in the memory AJ4 after finishing the capturing.

The timer AJ3 applies a predetermined voltage to the supply control unit AJ2 and the control unit AH1 at a predetermined time interval. The supply control unit AJ2 to which the voltage has been applied from the timer AJ3 operates the switch AD4, and connects the lithium-ion battery AD3 and the control unit AH1.

The control unit AH1, to which the predetermined voltage has been applied from the timer AJ3 and the power has been supplied from the lithium-ion battery AD3, reads out the image data stored in the memory AJ4, and transmits it the wireless base station AF4 via the wireless communication unit AH3.

Modification Example 11

As a specific example of the ballast A3, an electronic ballast, which is called an inverter, is thinkable. Such an electronic ballast supplies to the fluorescent lamp A4 not the alternating current having a frequency for a commercial power supply (the frequency that is generally supplied from a power supplier: 50 Hz or 60 Hz in Japan), but the alternating current having a high-frequency wave of which the frequency is 50 to 100 kHz. In a case where the energy acquisition unit A5 acquires the power with an electromagnetic induction like the foregoing modification example 1, the power quantity that can be acquired is in proportional to a value of the current flowing in the fluorescent lamp A4 and the frequency thereof. Thus, utilizing the electronic ballast enables acquisition of much more power to be expected.

Next, a second embodiment in the present invention will be explained.

In the above-mentioned first embodiment, the method of acquiring the energy from the magnetic field that was generated by the current flowing inside the fluorescent tube of the fluorescent lamp was described, and the method as well is thinkable of acquiring the energy from the current flowing in the electric wire connecting the fluorescent lamp A4 and the ballast A3. Thereupon, in this modification, a configuration of acquiring the energy from the current flowing in the electric wire connecting the fluorescent lamp A4 and the ballast A3 will be explained.

Figure 6:
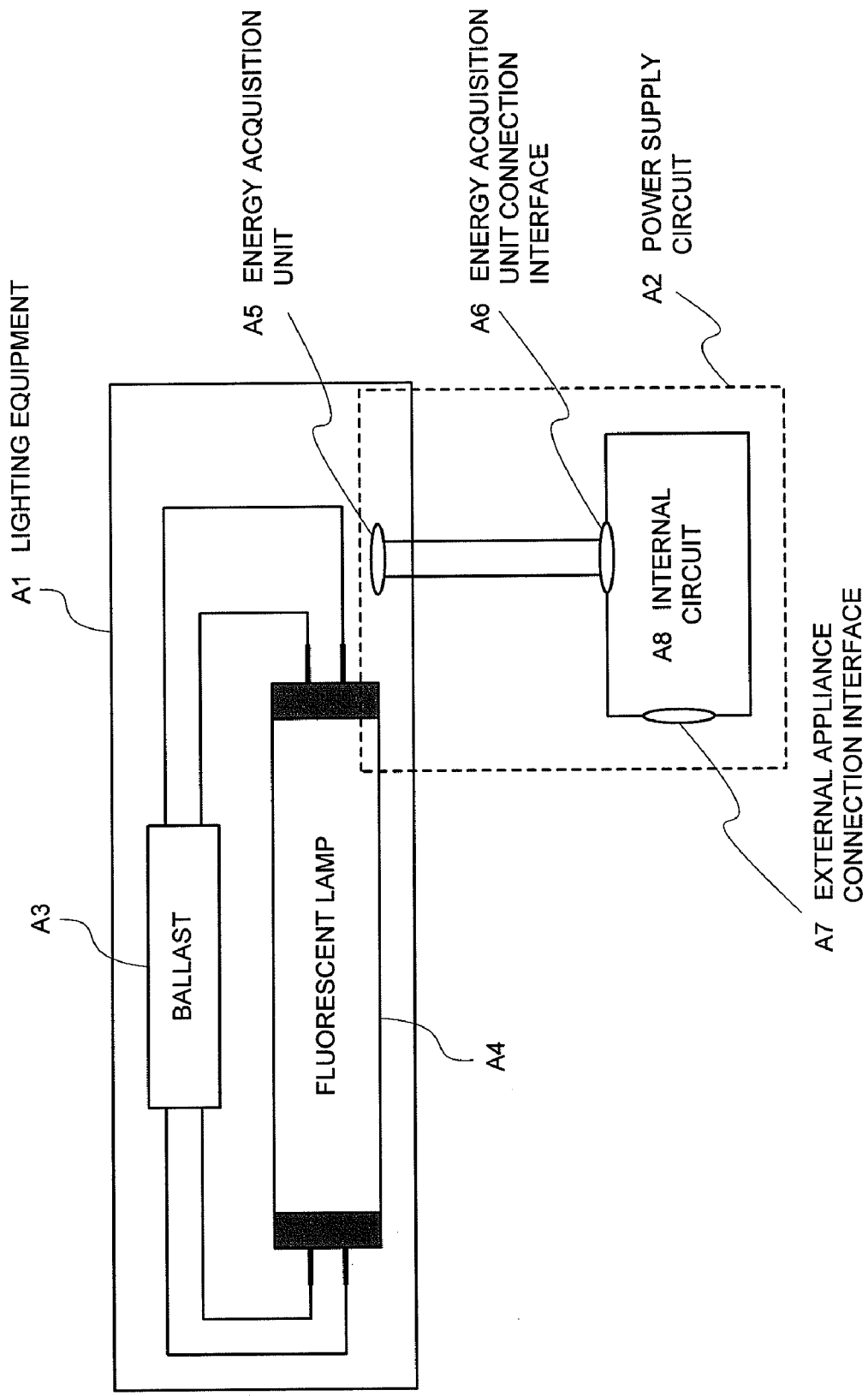
FIG. 6 is a view illustrating functional blocks of the lighting equipment A1 and the power supply circuit A2 in a second embodiment.

FIG. 6 is a block diagram illustrating a functional block in the case of acquiring the energy from the electric wire connecting the fluorescent lamp A4 and the ballast A3.

In this embodiment, the energy acquisition unit A5 is installed in a side of the fluorescent lamp A4 and the ballast A3.

Figure 7:
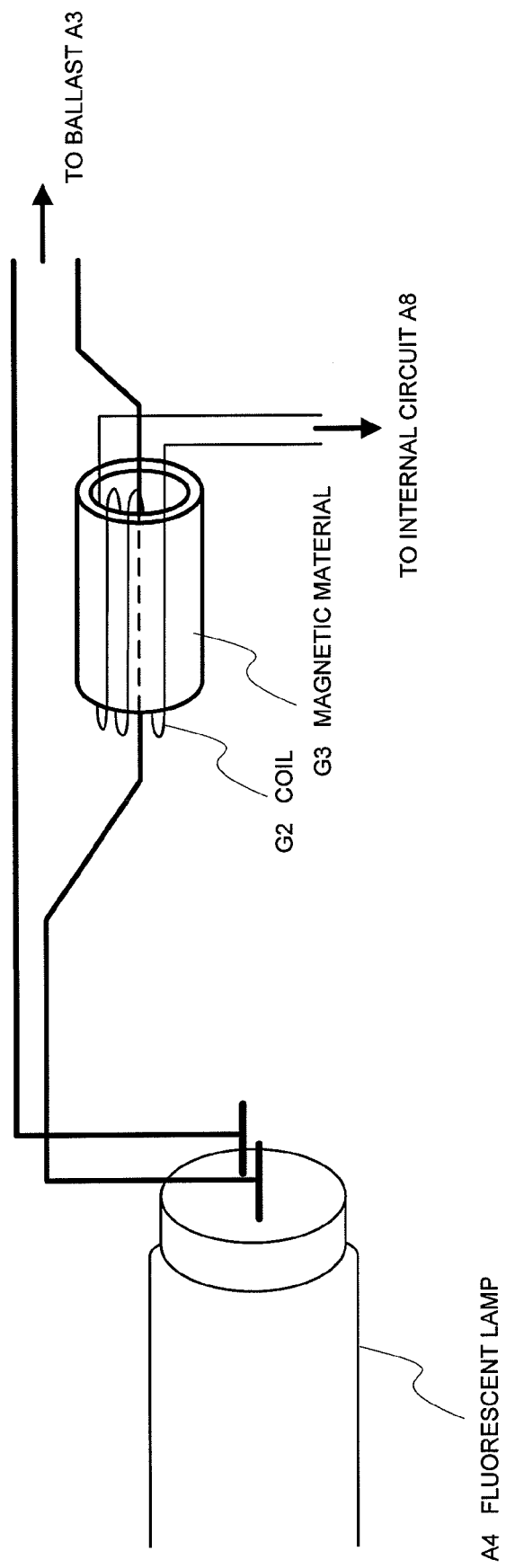
FIG. 7 is a view illustrating a structure of the energy acquisition unit in the second embodiment.

FIG. 7 is a view illustrating a structure of the energy acquisition unit in this embodiment. Additionally, for explanation, a pin of the fluorescent lamp A4 and the electric wire are directly connected in FIG. 7; however, as a matter of fact, by utilizing a connector, the fluorescent lamp A4 and the electric wire are connected.

The energy acquisition unit A5 includes a coil G2 and a magnetic material C3. One side, out of the electric wires connecting the pin of the fluorescent lamp A4 and the ballast 3, passes inside the magnetic material G3.

With this, the magnetic field that is generated by the alternating current flowing in the electric wire causes the coil G2 to generate the induced electromotive force, and the generated voltage is conveyed to the power supply circuit A2.

The drawing of this embodiment shows the case that the magnetic material is cylindrical; however the shape of the magnetic material could be a shape other than the cylindrical shape so long as the magnetic material can be installed so as to take a round about the fluorescent tube.

Further, the number of turns of the coil G2 is three; however the number of turns, which could be three or less, or three or more, is optional.

Besides, it does not matter that the energy acquisition unit 5 is configured of the coil G2 alone similarly to the modification example 1 of the first embodiment. In this case, the coil is installed in a side of the electric wire so that the magnetic field that is generated by the alternating current flowing in the electric wire penetrates a center of the coil G2.

Modification Example 1

In the second embodiment, the energy was acquired by causing one side, out of the electric wires connected with two pins of the fluorescent lamp A4, to pass through the magnetic material G3; however a configuration is thinkable of causing both electric wires of the fluorescent lamp A4 to pass through the magnetic material G3. Thereupon, in this embodiment, a configuration will be explained of causing both electric wires of the fluorescent lamp A4 to pass through the magnetic material G3.

Figure 8:
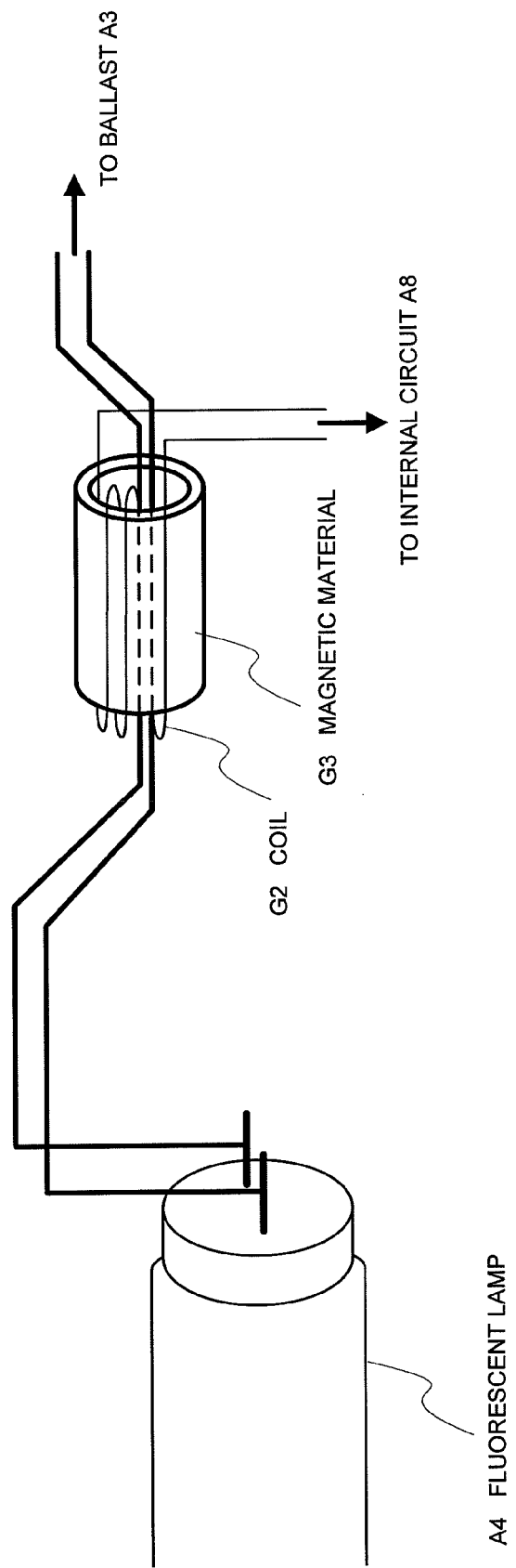
FIG. 8 is a view illustrating a structure of the energy acquisition unit in a modification example of the second embodiment.

FIG. 8 is a view illustrating a structure of the energy acquisition unit in this modification example.

Also in this modification example, the energy acquisition unit A5 is installed in a side of the fluorescent lamp A4 and the ballast A3.

The energy acquisition unit A5 includes a coil G2 and a magnetic material C3. Both electric wires connecting the pin of the fluorescent lamp A4 and the ballast 3 passes inside the magnetic material G3.

With this, the magnetic field that is generated by the alternating current flowing in the electric wire causes the coil G2 to generate the induced electromotive force, and the generated voltage is conveyed to the power supply circuit A2.

The drawing of this embodiment shows the case that the magnetic material is cylindrical; however the shape of the magnetic material could be a shape other than the cylindrical shape so long as the magnetic material can be installed so as to take a round about the fluorescent tube.

Further, the number of turns of the coil G2 is three; however the number of turns, which could be three or less, or three or more, is optional.

Besides, it does not matter that the energy acquisition unit 5 is configured of the coil G2 alone similarly to the modification example 1 of the first embodiment. In this case, the coil is installed in a side of the electric wire so that the magnetic field that is generated by the alternating current flowing in the electric wire penetrates a center of the coil G2.

Next, a third embodiment of the present invention will be explained.

In the above-mentioned first embodiment, the cylindrical magnetic material was utilized as one example, and a configuration as well in which the magnetic material is divided into two, and is connected with the fluorescent lamp is thinkable. Thereupon, in this embodiment, a configuration in which the magnetic material is divided into two, and is connected with the fluorescent lamp will be explained.

Figure 9:
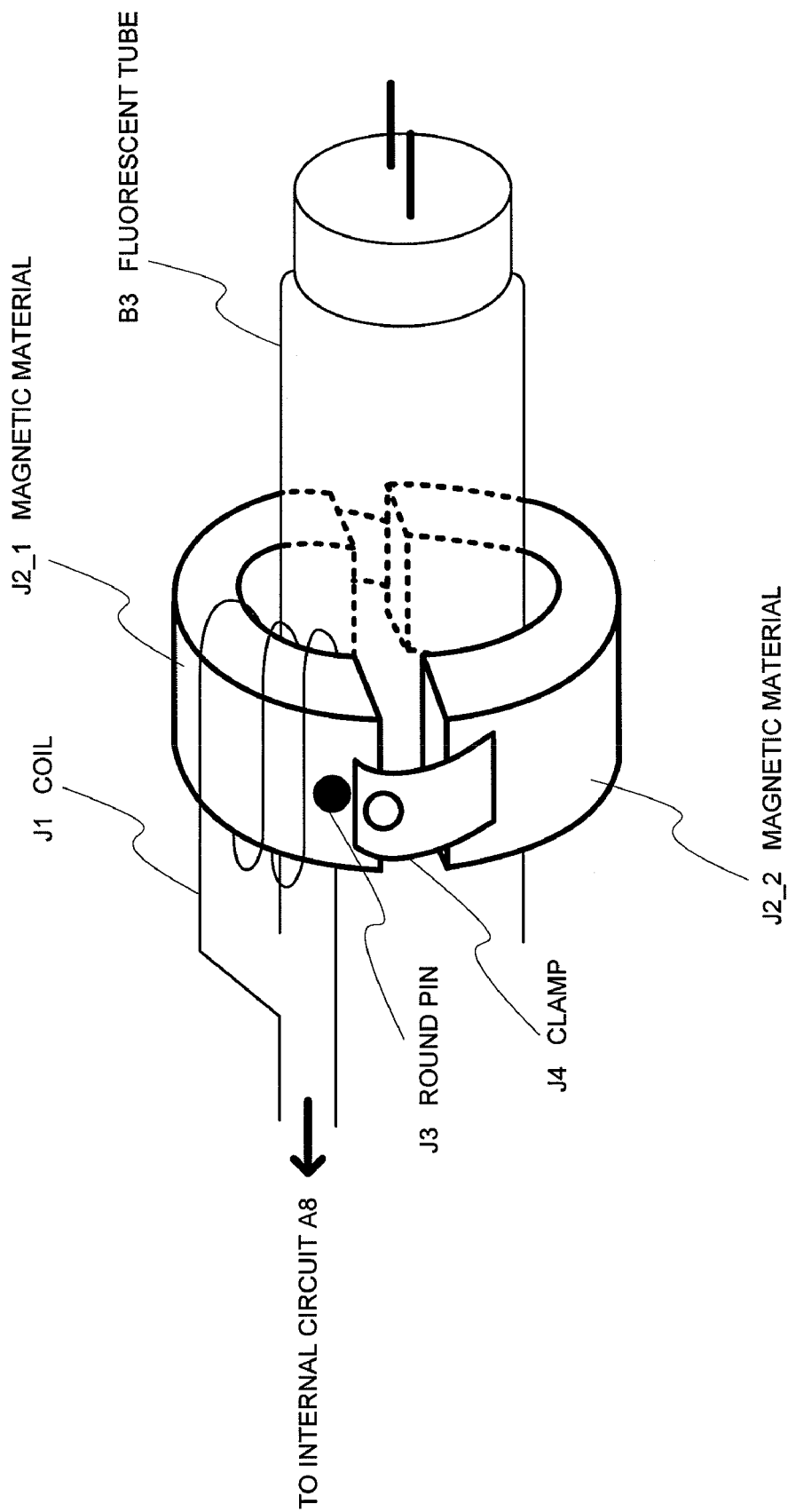
FIG. 9 is a view illustrating a structure of the energy acquisition unit in a third embodiment.

FIG. 9 is a view illustrating a connection mode of the magnetic material and the fluorescent lamp in this embodiment.

The energy acquisition unit in this embodiment includes magnetic materials J2_1 and J2_2 divided into two and a coil J1.

At the moment of mounting the magnetic materials J2_1 and J2_2 divided into two onto the fluorescent tube B3, for example, the magnetic materials J2_1 and J2_2 are matched in such a manner that they are put across the fluorescent tube B3 from each other, and are fixed by employing a clamp J4 with which one of the magnetic materials J2_1 and J2_2 is provided, and a round pin J3, with which the magnetic material having no clamp provided, out of the two magnetic materials, is provided. Additionally, any fixing mode, in which the magnetic materials J2_1 and J2_2 are matched in such a manner that they are put across the fluorescent tube B3 from each other, is acceptable. Further, the case that the magnetic material was divided into two was explained; however the number of division is optional.

The invention claimed is:

1. A power supply circuit for acquiring a power from a lighting equipment, the power supply circuit comprising:
    a power acquisition unit which acquires the power by utilizing a magnetic field that is generated by a current for turning on a fluorescent lamp of said lighting equipment,
    wherein said power acquisition unit comprises a magnetic material and a coil wound onto said magnetic material, and
    wherein said magnetic material is mounted so as to encircle a fluorescent tube of said fluorescent lamp, but not encircle electric wire for supplying the current for turning on said fluorescent lamp.

2. A power supply circuit according to claim 1, wherein, if said fluorescent lamp is turned on by an alternating current of which a frequency is higher than that of a commercial power supply, then said power acquisition unit acquires the power with an electromagnetic induction from the magnetic field that is generated by said alternating current.

3. A power supply circuit according to claim 1, wherein said magnetic material is ring-shaped.

4. A power supply circuit according to claim 1, wherein said magnetic material comprises a plurality of magnetic materials.

5. A power supply circuit according to claim 1, further comprising a rectification unit which rectifies an AC voltage supplied from said power acquisition unit into a DC voltage.

6. A power supply circuit according to claim 5, further comprising a voltage conversion unit which converts the DC voltage supplied from said rectification unit into a predetermined voltage.

7. A power supply circuit according to claim 5, further comprising a power accumulation unit which preserves the power supplied from said power acquisition unit.

8. A power supply circuit according to claim 5, further comprising a voltage limitation unit which limits the DC voltage being output by said rectification unit to a voltage of a predetermined value between said rectification unit and said voltage conversion unit.

9. A power supply circuit according to claim 8, wherein said voltage limitation unit comprises a Zener diode.

10. A power supply circuit according to claim 6, wherein said voltage conversion unit, if the voltage lower than a predetermined voltage is input, then steps up the input voltage to the predetermined voltage, and if the voltage higher than the predetermined voltage is input, then steps down the input voltage to the predetermined voltage.

11. A power supply circuit according to claim 6, wherein if said voltage conversion unit is configured to step down the DC voltage from said rectification unit, then said power acquisition unit adjusts the DC voltage, which is supplied to said voltage conversion unit by said rectification unit, so that it becomes a voltage higher than an output voltage of said voltage conversion unit, and said power acquisition unit outputs the set-up voltage to said rectification unit.

12. A power supply circuit according to claim 7, further comprising:
    a turning-off detection unit which detects that said fluorescent lamp has been turned off; and
    a discharge unit which causes said power accumulation unit to discharge the power preserved therein if said turning-off detection unit detects that said fluorescent lamp has been turned off.

13. A power supply circuit according to claim 12, wherein said turning-off detection unit monitors an output voltage of said power acquisition unit, and determines that said fluorescent lamp has been turned off if the above output voltage becomes lower than a predetermined voltage.

14. A power supply circuit according to claim 12, wherein said turning-off detection unit monitors an output voltage of said rectification unit, and determines that said fluorescent lamp has been turned off if the output voltage becomes lower than a predetermined voltage.

15. A power supply circuit according to claim 12, wherein said turning-off detection unit monitors an output voltage of said voltage conversion unit, and determines that said fluorescent lamp has been turned off if the output voltage becomes lower than a predetermined voltage.

16. A power supply circuit according to claim 7, wherein:
said power supply circuit comprises a turning-off detection unit which detects that said fluorescent lamp has been turned off; and
if said turning-off detection unit detects that said fluorescent lamp has been turned off, then said power accumulation unit starts to supply the accumulated power.

17. A power supply circuit according to claim 7, further comprising a power supply control unit which, if detecting predetermined sensor information, causes said power accumulation unit to start a supply of the power to an external appliance.

18. A power supply circuit according to claim 7, further comprising a power supply control unit which, if detecting predetermined sensor information, or at a predetermined time interval, causes said power accumulation unit to start a supply of the power to an external appliance.

19. A power supply circuit according to claim 17, wherein said sensor information is information as to whether or not a person exists.

20. A lighting system comprising:
a lighting equipment; and
a power acquisition unit which acquires a power by utilizing a magnetic field that is generated by a current for turning on a fluorescent lamp of said lighting equipment,
wherein said power acquisition unit comprises a magnetic material and a coil wound onto said magnetic material, and
wherein said magnetic material is mounted so as to encircle a fluorescent tube of said fluorescent lamp, but not encircle electric wire for supplying the current for turning on said fluorescent lamp.

21. A lighting system according to claim 20, wherein if said fluorescent lamp is turned on by an alternating current of which a frequency is higher than that of a commercial power supply, then said power acquisition unit acquires the power with an electromagnetic induction from the magnetic field that is generated by said alternating current.

22. A lighting system according to claim 20, wherein said magnetic material is ring-shaped.

23. A lighting system according to claim 20, wherein said magnetic material comprises a plurality of magnetic materials.

24. A lighting system according to claim 20, further comprising a rectification unit which rectifies an AC voltage supplied from said power acquisition unit into a DC voltage.

25. A lighting system according to claim 24, further comprising a voltage conversion unit which converts the DC voltage supplied from said rectification unit into a predetermined voltage.

26. A lighting system according to claim 20, further comprising a power accumulation unit which preserves the power supplied from said power acquisition unit.

27. A lighting system according to claim 24, further comprising a voltage limitation unit which limits the DC voltage being output by said rectification unit to a voltage of a predetermined value between said rectification unit and said voltage conversion unit.

28. A lighting system according to claim 27, wherein said voltage limitation unit comprises a Zener diode.

29. A lighting system according to claim 23, wherein said voltage conversion unit, if the voltage lower than a predetermined voltage is input, then steps up the input voltage to the predetermined voltage, and if the voltage higher than a predetermined voltage is input, then steps down the input voltage to the predetermined voltage.

30. A lighting system according to claim 25, wherein if said voltage conversion unit is configured to step down the DC voltage from said rectification unit, then said power acquisition unit adjusts the DC voltage, which is supplied to said voltage conversion unit by said rectification unit, so that it becomes a voltage higher than an output voltage of said voltage conversion unit, and said power acquisition unit outputs the set-up voltage to said rectification unit.

31. A lighting system according to claim 26, further comprising:
a turning-off detection unit which detects that said fluorescent lamp has been turned off; and
a discharge unit which causes said power accumulation unit to discharge the power preserved therein if said turning-off detection unit detects that said fluorescent lamp has been turned off.

32. A lighting system according to claim 31, wherein said turning-off detection unit monitors an output voltage of said power acquisition unit, and determines that said fluorescent lamp has been turned off if the above output voltage becomes lower than a predetermined voltage.

33. A lighting system according to claim 31, wherein said turning-off detection unit monitors an output voltage of said rectification unit, and determines that said fluorescent lamp has been turned off if the output voltage becomes lower than a predetermined voltage.

34. A lighting system according to claim 31, wherein said turning-off detection unit monitors an output voltage of said voltage conversion unit, and determines that said fluorescent lamp has been turned off if the output voltage becomes lower than a predetermined voltage.

35. A lighting system according to claim 26, wherein:
said lighting system comprises a turning-off detection unit which detects that said fluorescent lamp has been turned off; and
if said turning-off detection unit detects that said fluorescent lamp has been turned off, then said power accumulation unit starts to supply the accumulated power.

36. A lighting system according to claim 26, further comprising a power supply control unit which, if detecting predetermined sensor information, causes said power accumulation unit to start a supply of the power to an external appliance.

37. A lighting system according to claim 26, further comprising a power supply control unit which, if detecting predetermined sensor information, or at a predetermined time interval, causes said power accumulation unit to start a supply of the power to an external appliance.

38. A lighting system according to claim 36, wherein said sensor information is information as to whether or not a person exists.

39. A lighting system according to claim 20, further comprising:
a capturing unit which captures an image data by employing the power being supplied from said power acquisition unit; and
a wireless unit which transmits said captured image data by employing the power being supplied from said power acquisition unit.

40. A lighting system according to claim 20, further comprising:

a capturing unit which captures an image data by employing the power being supplied from said power acquisition unit;

a storage which stores said captured image data; and a wireless unit which transmits the image data of said storage by employing the power being supplied from said power acquisition unit.

41. A lighting system according to claim 39, further comprising:

a wireless base station which transmits said transmitted image data to a monitoring server; and a server which accumulates the image data from said wireless base station.

42. A power supply circuit comprising:

a power acquisition unit which acquires a power by utilizing a magnetic field that is generated by a current for turning on a fluorescent lamp; and an interface which connects a transmitter which transmits a signal by employing said acquired power, wherein said power acquisition unit comprises a magnetic material and a coil wound onto said magnetic material, and wherein said magnetic material is mounted so as to encircle a fluorescent tube of said fluorescent lamp, but not encircle electric wire for supplying the current for turning on said fluorescent lamp.

43. A power supply unit according to claim 42, wherein if said fluorescent lamp is turned on by an alternating current of which a frequency is higher than that of a commercial power supply, then said power acquisition unit acquires the power with an electromagnetic induction from the magnetic field that is generated by said alternating current.

44. A lighting system comprising:

a lighting equipment;

a power acquisition unit which acquires a power by utilizing a magnetic field that is generated by a current for turning on a fluorescent lamp of said lighting equipment; and an interface which connects an electric appliance that operates by employing said acquired power, wherein said power acquisition unit comprises a magnetic material and a coil wound onto said magnetic material, and wherein said magnetic material is mounted so as to encircle a fluorescent tube of said fluorescent lamp, but not encircle electric wire for supplying the current for turning on said fluorescent lamp.

45. A lighting system according to claim 44, wherein if said fluorescent lamp is turned on by an alternating current of which a frequency is higher than that of a commercial power supply, then said power acquisition unit acquires the power with an electromagnetic induction from the magnetic field that is generated by said alternating current.

* * * * *

UNITED STATES PATENT AND TRADEMARK OFFICE
CERTIFICATE OF CORRECTION

| | | |
|---|---|---|
| PATENT NO. | : 8,164,407 B2 | Page 1 of 1 |
| APPLICATION NO. | : 12/159296 | |
| DATED | : April 24, 2012 | |
| INVENTOR(S) | : Matsuda | |

It is certified that error appears in the above-identified patent and that said Letters Patent is hereby corrected as shown below:

In the Claims

Column 18, Line 26: In Claim 7, delete "5," and insert -- 1, --

Column 19, Line 66: In Claim 29, delete "23," and insert -- 25, --

Signed and Sealed this
Fourth Day of March, 2014

Michelle K. Lee
*Deputy Director of the United States Patent and Trademark Office*